US011954286B1

(12) United States Patent
Yang et al.

(10) Patent No.: US 11,954,286 B1
(45) Date of Patent: Apr. 9, 2024

(54) LOW-NOISE SELF-CAPACITOR SENSING FOR CAPACITIVE TOUCH PANELS

(71) Applicant: Shenzhen Goodix Technology Co., Ltd., Shenzhen (CN)

(72) Inventors: Chao Yang, San Diego, CA (US); Dazhi Wei, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/177,745

(22) Filed: Mar. 2, 2023

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/044* (2013.01)

(58) Field of Classification Search
CPC ....... G06F 3/0418; G06F 3/0412; G06F 3/044
See application file for complete search history.

(56) References Cited

U.S. PATENT DOCUMENTS

2018/0232095 A1\* 8/2018 Ikeda ...................... G06F 3/044

\* cited by examiner

*Primary Examiner* — Yaron Cohen
(74) *Attorney, Agent, or Firm* — Kilpatrick Townsend & Stockton LLP

(57) ABSTRACT

Techniques are described for low-noise self-capacitor sensing in a capacitive touch panel array integrated with a display panel. Each channel of the array has a self-capacitance (Ci) that changes responsive to presence or absence of a local touch event local. Each channel is read by an analog front-end (AFE) by using a locally noise-suppressed discharge current for a discrete discharge time to discharge Ci to obtain a discharge voltage level that differs with presence or absence of the local touch event, and outputting a voltage output for the channel based on the discharge voltage level by passively mixing at least the discharge voltage level to produce a pair of up-converted channel signals, sampling the pair of up-converted channel signals to obtain a differential voltage sample, and amplifying the differential voltage sample to generate the Vout as indicating absence or presence of the touch event local to the channel.

20 Claims, 17 Drawing Sheets

LOW-NOISE SELF-CAPACITOR SENSING FOR CAPACITIVE TOUCH PANELS

TECHNICAL FIELD

The present document relates to sensing circuits, and, more particularly, to discrete-time self-capacitor sensing approaches with low noise, such as for use in large capacitive touch panels.

BACKGROUND

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently low-noise read-out circuits for such applications.

Often, the touch-sensing layers of the display include an array of "mutual capacitors" and "self-capacitors." For example, there is a self-capacitor for each row and for each column of the array, and there is a mutual capacitor at each row-column intersection of the array. The mutual capacitors in the touch panel tend to be the primary sensing elements because they tend to provide more accurate information regarding touch (e.g., finger) locations. Still, self-capacitor sensing can provide a useful alternative (or supplemental) source of touch-sensing information, especially for cases in which mutual-capacitor sensing tends to be inaccurate (e.g., when a user has wet fingers).

However, self-capacitor sensing can be more challenge, due to smaller signal levels than those obtained with mutual capacitor sensing. The change in capacitance induced in a self-capacitor during a touch even may typically be only a small fractional of its base capacitance value. To reliably sense such a small change in capacitance, sensing circuits can be designed to effectively cancel the base capacitance value with sufficiently low read-out noise. While several conventional approaches exist, those approaches tend to have limitations.

BRIEF SUMMARY

Embodiments disclosed herein include systems and methods for low-noise self-capacitor sensing in a capacitive touch panel, such as integrated into a display of a touchscreen electronic device. For example, a touch panel array is integrated with a display panel and has multiple touch sense channels. Each channel has a respective channel self-capacitance (Ci) that includes a respective base self-capacitance (Cs) corresponding to display noise capacitively coupled onto the channel from the display panel and a respective touch capacitance (Ctouch) that changes responsive to presence of a touch event local to the channel. Each channel is coupled with an analog front-end (AFE) via a voltage input (Vin) node having a voltage relating to a voltage across the Ci of the channel. The AFE includes a discharge stage and a sensing stage. The discharge stage applies a locally noise-suppressed discharge current (Iout) to the Vin node for a discrete discharge time to discharge the Vin node to a discharge voltage level that is different depending on presence or absence of a touch event local to the channel. The sensing stage outputs a voltage output for the channel based on the discharge voltage level by passively mixing at least the discharge voltage level to produce a pair of up-converted channel signals, sampling the pair of up-converted channel signals to obtain a differential voltage sample, and amplifying the differential voltage sample to generate the Vout as indicating absence or presence of the touch event local to the channel.

According to a first set of embodiments, a method is provided for self-capacitor sensing in a touch panel array integrated with a display panel, the touch panel array having a plurality of channels, each having a respective channel self-capacitance that includes a respective base self-capacitance corresponding to display noise capacitively coupled onto the channel from the display panel and a respective touch capacitance that changes responsive to presence of a touch event local to the channel. The method includes: charging, in a first phase of a readout cycle, a voltage input (Vin) node to a charged voltage level, the Vin node being coupled with a channel of the plurality of channels, such that a voltage at the Vin node relates to a voltage across the respective self-capacitance (Ci) of the channel coupled thereto; discharging, in a second phase of the readout cycle following the first phase, the Vin node with a locally noise-suppressed discharge current (Iout) for a discrete discharge time, thereby discharging the Vin node to a discharge voltage level that is a first voltage level in absence of a touch event local to the channel and is a second voltage level in presence of the touch event local to the channel; outputting, in a third phase of the readout cycle following the second phase, a voltage output (Vout) for the channel by passively mixing at least the discharge voltage level to produce a pair of up-converted channel signals, sampling the pair of up-converted channel signals to obtain a differential voltage sample, and amplifying the differential voltage sample to generate the Vout as indicating absence or presence of the touch event local to the channel.

In some such embodiments, the readout cycle includes two half-cycles. The method can further include, in a first half-cycle of the readout cycle: setting a passive mixer to a pass-through configuration; and performing the charging, the discharging, and the outputting with the passive mixer in the pass-through configuration. The method can further include, in a second half-cycle of the readout cycle: setting the passive mixer to a swapped configuration; and performing the charging, the discharging, and the outputting with the passive mixer in the swapped configuration. In such embodiments, the passive mixer receives the discharge voltage level of the Vin node at a first input, receives either another discharge voltage level associated with an adjacent channel or receives a common-mode reference voltage level at a second input, and produces the pair of up-converted channel signals at first and second outputs by: in the pass-through configuration, coupling the first input with the first output and the second input with the second output; and in the swapped configuration, coupling the first input with the second output and the second input with the first output.

According to another set of embodiments, a system is provided for self-capacitor sensing in a touch panel array integrated with a display panel, the touch panel array having a plurality of channels, each having a respective channel self-capacitance that includes a respective base self-capacitance corresponding to display noise capacitively coupled onto the channel from the display panel and a respective touch capacitance that changes responsive to presence of a touch event local to the channel. The system includes: a voltage input (Vin) node coupled with a channel of the plurality of channels, such that Vin represents a voltage across the respective self-capacitance (Ci) of the channel; a discharge stage configured to couple the Vin node with a locally noise-suppressed discharge current (Iout) for a discrete discharge time during a discharge phase to discharge the Vin node to a discharge voltage level, such that the discharge voltage level is a first voltage level in absence of a touch event local to the channel and is a second voltage level in presence of the touch event local to the channel; and a sensing stage coupled with the discharge stage to output a voltage output (Vout) for the channel by passively mixing at least the discharge voltage level to produce a pair of up-converted channel signals, sampling the pair of up-converted channel signals to obtain a differential voltage sample, and amplifying the differential voltage sample to generate the Vout as indicating absence or presence of the touch event local to the channel.

In some such embodiments, the system further includes: a plurality of instances of the Vin node, each to couple with a respective channel of the plurality of channels, such that each ith instance of the Vin node (Vin_i) represents a voltage across the ith respective Ci (Ci_i) of the ith respective channel coupled thereto; a plurality of instances of the discharge stage, wherein each ith instance of the discharge stage is configured to couple the Vin_i with an ith locally noise-suppressed discharge current (Iout_i) during a discharge phase to discharge the Vin_i to an ith respective discharge voltage level, each ith respective discharge voltage level being the first voltage level in absence of a touch event local to the ith respective channel and being the second voltage level in presence of the touch event local to the ith respective channel; and a plurality of instances of the sensing stage coupled with the plurality of instances of the discharge stage, wherein each ith instance of the sensing stage is configured to output an ith respective voltage output (Vout_i) for the ith respective channel by passively mixing at least the ith discharge voltage level to produce an ith pair of up-converted channel signals, sampling the ith pair of up-converted channel signals to obtain an ith differential voltage sample, and amplifying the ith differential voltage sample to generate an ith voltage output instance indicating absence or presence of the touch event local to the ith respective channel.

Some such embodiments of the system for self-capacitor sensing are provided as part of a display system. The display system includes: a display panel; the touch panel array integrated with the display and having a plurality of channels, each having a respective channel self-capacitance that includes a respective base self-capacitance corresponding to display noise capacitively coupled onto the channel from the display panel and a respective touch capacitance that changes responsive to presence of a touch event local to the channel; and a plurality of instances of the system of claim 1, each instance of the Vin node coupled with a respective one of the plurality of channels.

The drawings, the description and the claims below provide a more detailed description of the above, their implementations, and features of the disclosed technology.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently low-noise read-out circuits for such applications.

Figure 1:
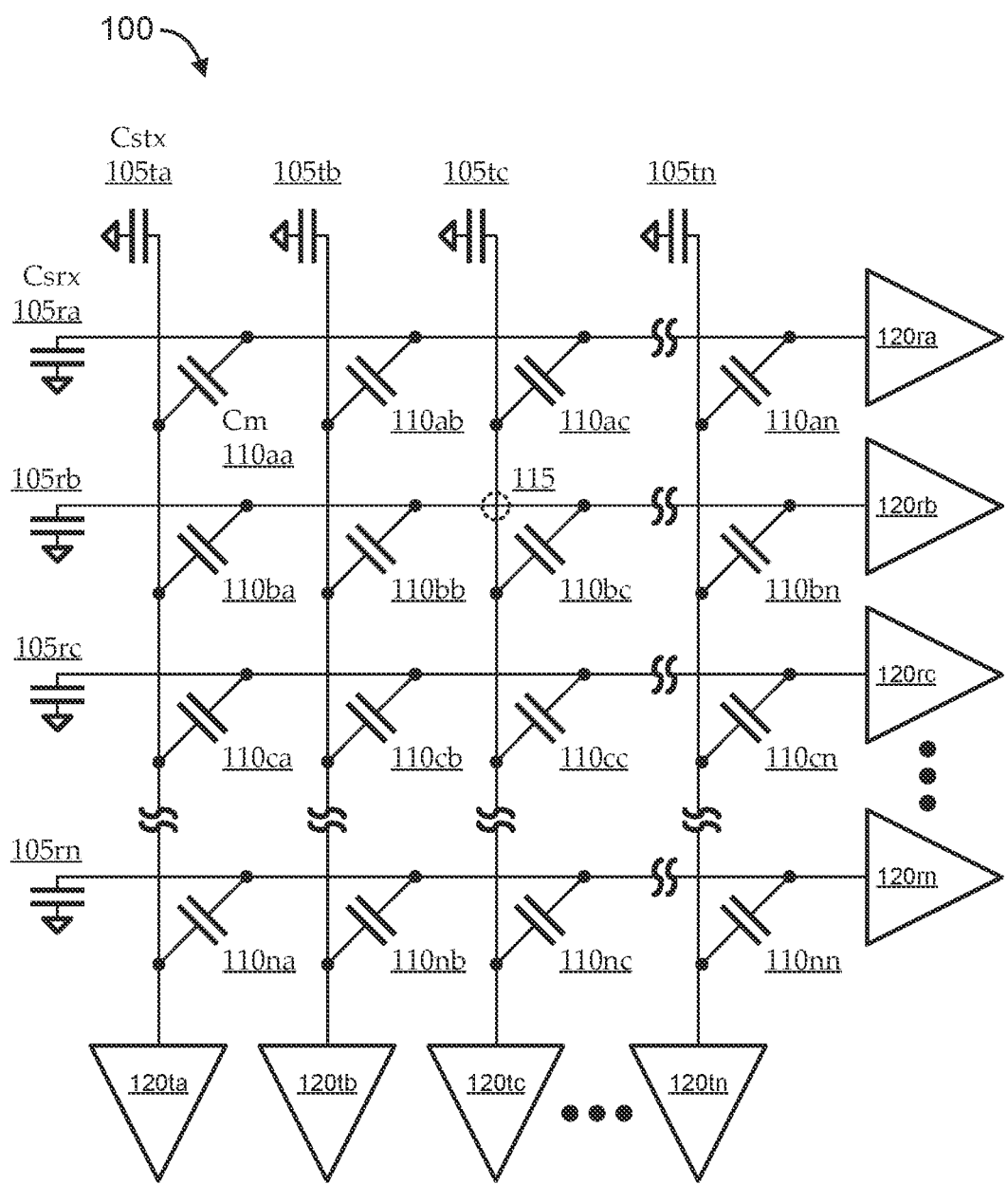
FIG. 1 shows a simplified portion of an illustrative conventional touch panel array having rows and columns.

FIG. 1 shows a simplified portion of an illustrative touch panel array 100 having rows and columns. In general, the touch panel array 100 is configured to sense when and where a user touches the array by sensing a change in capacitance and associating the sensed change to a particular row-column intersection location. A "mutual capacitor" (Cm) 110 (illustrated as 110*aa*-110*nn*) is located at each row-column intersection location. Additionally, each row and each column of the array 100 is coupled with a respective "self-capacitor" (Cs) 105 (illustrated as Csrx 105*ra*-105*rn* and Cstx 105*ta*-105*tn*). The row-wise self-capacitors are labeled "Csrx", and the column-wise self-capacitors are labeled "Cstx."

As used herein, a touch event is considered as any touch interaction with the touch panel array 215 that is detectable by any one or more of the touch sense circuits 120. A touch event is considered herein to be "local" to a particular row or column line when the touch event is sufficiently proximate to the particular row or column line so as to manifest as a change in capacitance (mutual capacitance and/or self-capacitance) that is detectable by at least the touch sense circuit 120 coupled with that particular row or column line. Correspondingly, a touch event is considered herein to be local to a particular self-capacitor 105 when the touch event is sufficiently proximate to the particular row or column line coupled with the self-capacitor 105 so as to manifest as a change in self-capacitance that is detectable by at least the touch sense circuit 120 coupled with the particular row or column line; and a touch event is considered herein to be local to a particular mutual capacitor 110 when the touch event is sufficiently proximate to the mutual capacitor 110 so as to manifest as a change in mutual-capacitance that is detectable by at least the touch sense circuit 120 receiving the signal driven through the mutual capacitor 110. Similarly, a touch event is considered herein to be local to a particular touch sense circuit 120 when the touch event is sufficiently proximate to any portion of the touch panel array 100 so as to manifest as a change in mutual-capacitance and/or self-capacitance that is detectable by at least the particular touch sense circuit 120.

For example, a touch event occurring (e.g., a finger being placed) at the circled row-column intersection location 115 can cause a detectable change in capacitance relating to mutual capacitor 110*bc*, row-wise self-capacitor 105*rb*, and column-wise self-capacitor 105*tc*. As such, the touch event can be considered as local to at least: the third column line, the second row line, row-wise self-capacitor 105*rb*, column-wise self-capacitor 105*tc*, mutual capacitor 110*bc*, touch sense circuit 120*rb*, and touch sense circuit 120*tc*. In some cases, the same touch event may be local to (i.e., and therefore detectable in relation to) multiple adjacent row lines, column lines, self-capacitors 105 and/or mutual capacitors 110.

Although not explicitly shown as such, the touch panel array 100 can be integrated as part of a display, such as a touchscreen display of an electronic device. The grid of row lines and column lines effectively provides a number of touch sense channels. The mutual capacitors 110 in the touch panel array 100 tend to be the primary sensing elements because they tend to provide more accurate information regarding touch (e.g., finger) locations. Mutual capacitance of one of the mutual capacitors 110 is typically measured by driving a signal through the column and row lines coupled with the mutual capacitor 110, and measuring the output. For example, measuring the capacitance of mutual capacitor 110*bc* can involve coupling a driver (not shown) with the column line corresponding to column-wise self-capacitor 105*tc*. The driver can transmit a signal through the column line, and the signal is coupled, via mutual capacitor 110*bc*, onto the row line corresponding to row-wise self-capacitor 105*rb*. The signal can then be received at a touch sense circuit 120*rb* coupled with the row line, and measured to detect any change in capacitance indicating presence of a touch event at the mutual capacitor 110*bc*.

In addition to mutual-capacitor 110 sensing, self-capacitor 105 sensing can provide a useful alternative (or supplemental) source of touch-sensing information, especially for cases in which mutual-capacitor 110 sensing tends to be inaccurate (e.g., when a user has wet fingers). Although the self-capacitors 105 are illustrated in FIG. 1 as discrete devices, each self-capacitor 105 represents an aggregate parasitic capacitance over the corresponding row line or column line with illustrated as coupled with the self-capacitor 105 is coupled. For example, as noted above, the touch panel array 100 can be integrated with a display, and the parasitic capacitance of the self-capacitors 105 can manifest from capacitively coupled display noise. Measuring the self-capacitors 105 typically does not involve driving a signal through row or column lines of the touch panel array 100. Rather, as illustrated in FIG. 1, each row line and each column line is coupled with a respective touch sense circuit 120 (illustrated as touch sense circuits 120*ra*-120*rn* for the row-lines and as touch sense circuits 120*ta*-120*tn* for the column lines). As described herein, a touch event proximate to a particular row or column line can manifest as a change in self-capacitance sense by the touch sense circuit 120 coupled with that row or column line.

Figure 2:
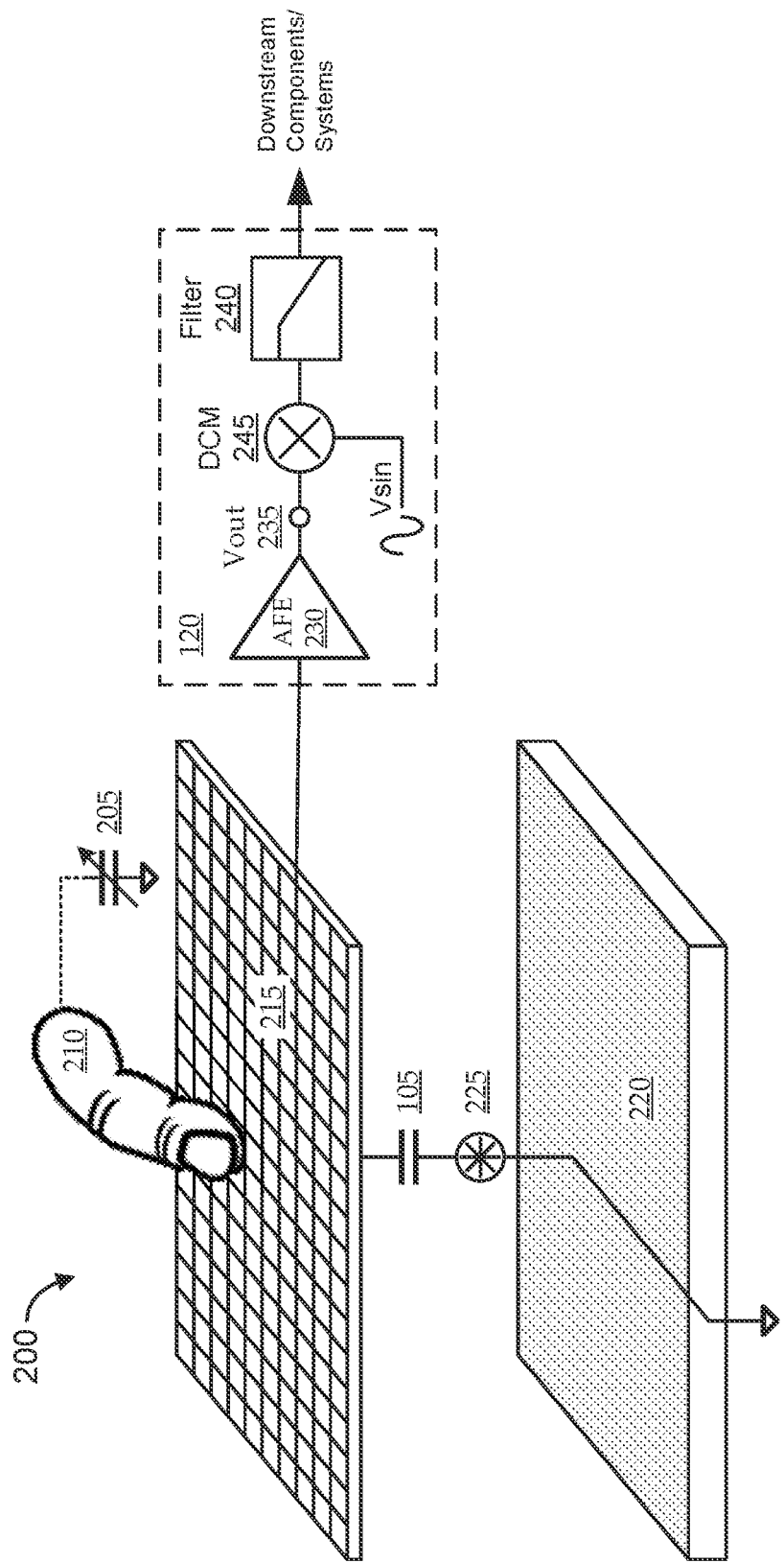
FIG. 2 shows a simplified portion of a touch sensing environment to further illustrate self-capacitor sensing.

FIG. 2 shows a simplified portion of a touch sensing environment 200 to further illustrate self-capacitor sensing. The illustrated environment shows a touch panel array 215 (e.g., implemented by touch panel array 100 of FIG. 1) integrated with a display panel 220. Typically, a common cathode layer (e.g., which can be considered as a local ground plane) of the display panel 220 faces the touch panel array 215. Capacitively coupled display noise 225 from the display panel 220 manifests at the touch panel array 215 as self-capacitance (i.e., a parasitic capacitance) on the row and column lines of the touch panel array 215, which can be represented (e.g., as in FIG. 1) as self-capacitors 105 coupled with those row and column lines. Only one self-capacitor 105 is shown to avoid over-complicating the figure.

As discussed with reference to FIG. 1, each row and column line can be coupled with a respective touch sense circuit 120 (only one is shown). Embodiments of the touch sense circuit 120 typically include an analog front-end (AFE) 230 that generates a channel sense output voltage (Vout) 235. It can be desirable to include an up-converting stage in the AFE 230 to up-convert the input (direct-current, DC) signal to a higher frequency to help eliminate AFE low-frequency noise. The AFE 230 path then includes a subsequent down-converting mixer (DCM) 245 to move the signal back to DC. A filter 240 after the DCM 245 can help keep the DC signal, while eliminating higher frequency spurs. For example, without up-conversion, the output of the AFE 230 is typically a DC magnitude (e.g., resulting from an average magnitude over a series of single-polarity pulses). The up-converting stage can result in the output of the AFE 230 being a series of pulses with alternating polarity, so that the detected signal is represented as a magnitude at a particular frequency (i.e., not DC, and with low-frequency noise effectively removed). The DCM 245 can then mix the AFE 230 output with a sinusoid of the same frequency to produce a DC output signal corresponding to the DC input signal.

When there is no touch event local to the touch sense circuit 120, the touch sense circuit 120 is configured to generate the Vout 235 based on a channel capacitance corresponding to a base capacitance value of the corresponding self-capacitor 105. When a touch event is present, the amount of self-capacitance manifest by self-capacitor 105 changes. For example, as illustrated, a finger 210 touching the touch panel array 215 can manifest as a touch capacitance 205 providing a parallel capacitive path to ground. This can effectively increase the apparent self-capacitance of any self-capacitors 105 local to the touch event. Accordingly, the touch sense circuit 120 is configured to generate the Vout 235 based on an increased channel capacitance corresponding to the base capacitance value of the corresponding self-capacitor 105 plus the additional parallel capacitance provided by the touch event (i.e., channel capacitance=Cs 105+Ctouch 205).

While this type of self-capacitor 105 sensing can be effective, it can tend to be more challenge than mutual-capacitor 110 sensing at least because self-capacitor sensing tends involve much smaller signal levels than those obtained with mutual capacitor 110 sensing. The change in capacitance induced in a self-capacitor 105 during a local touch even may typically be only a small fractional of its base capacitance value. For example, there may typically be less than a 0.1-percent difference in measured capacitance between a touch and a non-touch condition. To reliably sense such a small change in capacitance, sensing circuits can be designed to effectively cancel the base capacitance value with very low read-out noise.

Figure 3:
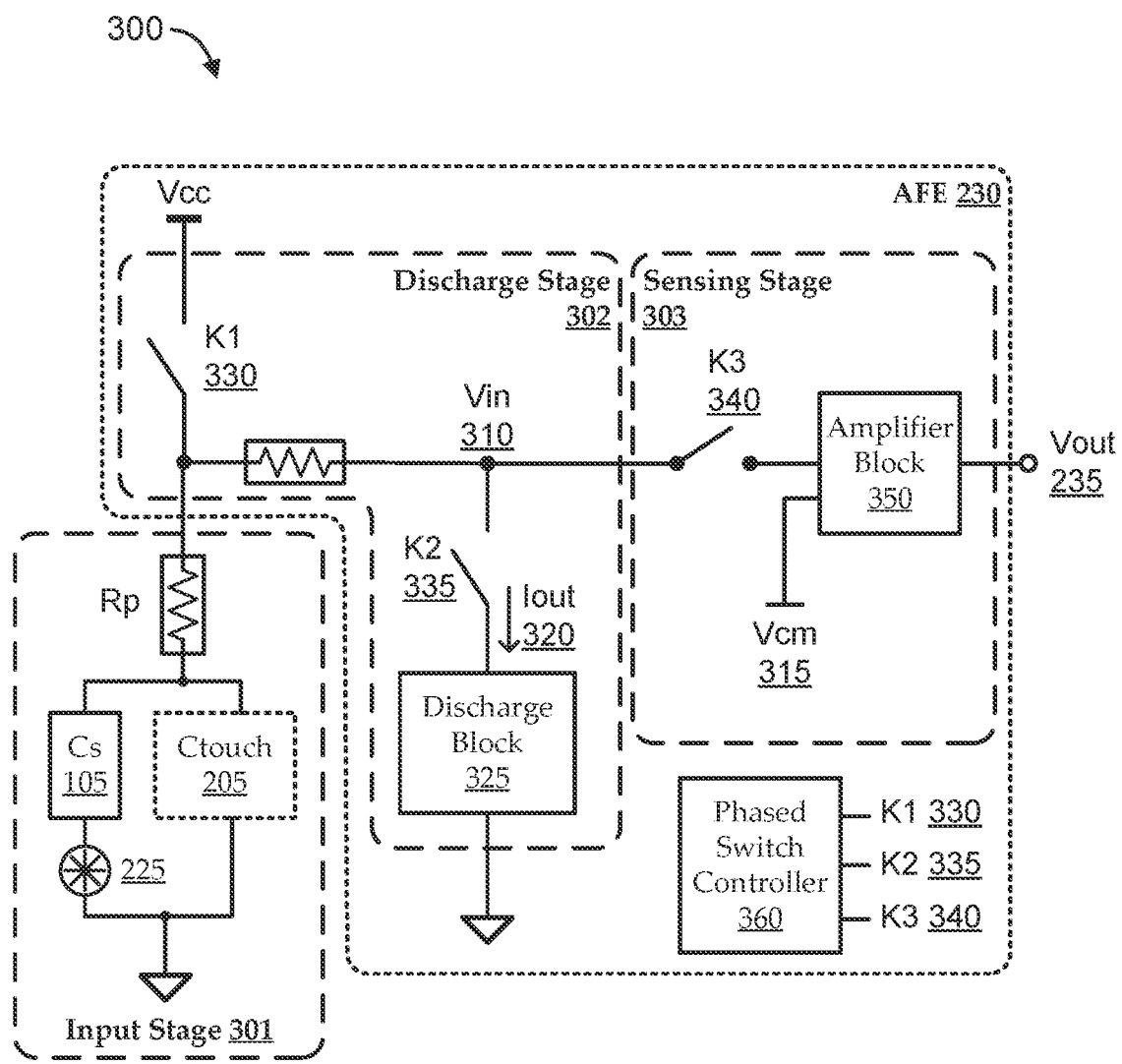
FIG. 3 shows a high-level block diagram of a self-capacitor sensing environment for discrete-time sensing.

FIG. 3 shows a high-level block diagram of a self-capacitor sensing environment 300 for discrete-time sensing. The environment 300 generally includes an input stage 301, a discharge stage 302, and a sensing stage 303. The input stage 301 can represent a particular row line or column line (channel) of a touch panel array (e.g., touch panel array 100 of FIG. 1, touch panel array 215 of FIG. 2, etc.) as seen at the input of a coupled touch sense circuit 120. As described in FIG. 2, the input to the touch sense circuit 120 can be an AFE 230, which can be implemented as the discharge stage 302 and the sensing stage 303 (i.e., as used herein, the AFE 230 is considered to include both the discharge stage 302 and the sensing stage 303). Although particular components are illustrated in particular arrangements and/or stages for the sake of clarity, alternate embodiments can rearrange and/or regroup components without departing from the scope of embodiments described herein.

Input stage 301 represents a particular channel of a capacitive touch sense array, as seen by the AFE 230. As described above, a base capacitance of a self-capacitor 105 for a channel corresponds to capacitively coupled display noise 225 from an integrated display panel. The total self-capacitance of the channel (Ci) can be represented simplistically as the self-capacitor 105 in parallel with a touch capacitance 205 (i.e., Ci=Cs+Ctouch). The amount of added touch capacitance 205 can be zero in absence of any touch event local to the self-capacitor 105, or some detectable (e.g., Ctouch>0) value in presence of a touch event local to the self-capacitor 105. The input stage 301 is further illustrated as having an impedance, as represented in FIG. 3 by resistors. The output of the input stage 301 can manifest as an input voltage level at an input voltage node (Vin) 310 of the AFE 230.

Figure 4:
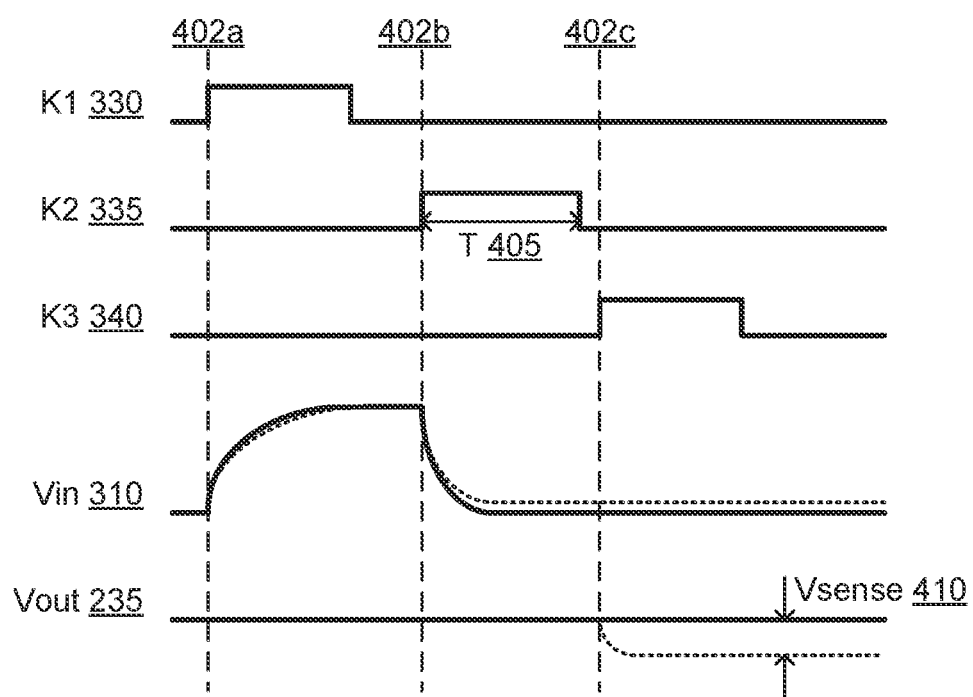
FIG. 4 shows simplified illustrative waveforms and timing at the three phases of operation.

Operation of the stages of FIG. 3 generally follows three phases corresponding to timing of three switches, K1 330, K2 335, and K3 340. The timing of the phases is controlled by a phased switch controller 360. To provide added clarity to the description of FIG. 3, FIG. 4 shows simplified illustrative waveforms and timing at the three phases 402 of operation. Signals used to control particular switches are labeled using the labels of the switches (e.g., the signal labeled "K1 330" in FIG. 4 is the signal used to control switch K1 330 in FIG. 3).

In a first phase 402a, K1 330 is closed for a charging time. As illustrated in FIG. 3, closing K1 330 couples the capacitive input 301 to a source voltage (Vcc) through a resistor (Rp), thereby charging the channel self-capacitance (Ci). Closing K1 330 also effectively couples Vin 310 with Vcc (e.g., via an input impedance, as illustrated), such that the voltage drop between Vin 310 and ground across the capacitive input 301 in series with Rp 307 increases to Vcc (or to some predetermined level below Vcc based on the input impedance) in the first phase 402a. After Ci is charged, K1 330 is opened. FIG. 4 shows an illustrative plot of Vin 310 charging up to the fully charged voltage level. A thicker solid line indicates behavior of Vin 310 in absence of a touch event (Ci=Cs), and a thinner dashed line indicates behavior of Vin 310 in presence of a touch event (Ci=Cs+Ctouch).

In a second phase 402b, K2 335 is closed for a predetermined discharge time (T) 405 (both K1 330 and K3 340 are open). The predetermined discharge time (T) 405 is also referred to herein as a "discrete discharge time," and the self-capacitive sensing approaches described herein can be considered as types of discrete-time sensing approaches, accordingly. As illustrated in FIG. 3, closing K2 335 couples Vin 310 with a discharge block 325. The voltage across Ci and Rp (i.e., relating to Vin 310) is discharged for the predetermined amount of time by a discharge current (Iout) 320, as provided by discharge block 325. The rate of discharge through the discharge block 325 is inversely related to the Ci. As such, the difference in Ci between presence of a local touch event and absence of a local touch event yields a difference in discharge rate through discharge block 325. The illustrative plot of Vin 310 in FIG. 4 shows this effect. The discharging as manifest at Vin 310 is slower in presence of a local touch event (dashed line) than in absence of a local touch event (solid line), due to the increased capacitance of Ci coming from the additional Ctouch 205 when there is a local touch event. The components (at least of the discharge stage 302) are configured to draw a certain amount of charge from Vin 310 so that, at the end of T 405 (i.e., after a discrete discharge time): Vin has been reduced to a discharge reference level (Vcm) 315 in absence of a local touch event (i.e., when Ci=Cs); or Vin has been reduced to a level that is detectably different from (e.g., above) Vcm 315 in presence of a local touch event. Thus, after T 405, when K2 335 is opened, the remaining charge on Ci (and the corresponding level of Vin 310) is detectably different between touch event and non-touch event conditions.

In a third phase 402c, K3 340 is opened (with K1 330 and K2 335 closed). As illustrated in FIG. 3, closing K3 340 couples Vin 310 with an amplifier block 350. The amplifier block 350 is configured to amplify the difference in Vin 310 between touch event and non-touch event conditions, so that the difference can be read out as a reliably detectable difference in channel sense output voltage (Vout) 235 output by the AFE 230. An illustrative plot of Vout 235 is shown in FIG. 4, and an illustrative difference in Vout 235 between the touch event and non-touch event conditions is labeled as Vsense 410. For a typical amplifier block 350 having gain (a), Vout 235 can be expressed as:

$$V_{out} = \alpha \frac{(V_{CC} - V_{CM})C_{touch}}{C_S + C_{touch}}.$$

In some implementations, the amplifier block 350 compares Vin 310 with discharge reference level (Vcm) 315. For example, as described above, parameters (e.g., T 405, Iout 320, etc.) are set so that Vin 235 decays to a level substantially equal to Vcm 315 in the second phase 402b in absence of a local touch event, or Vin 310 decays to a level detectably different from (e.g., greater than) Vcm 315 in presence of a local touch event. For a capacitor, it is known that the capacitor current (Ic) is related to its capacitance and change in voltage over time: Ic=C*(dV/dt). In context of this example implementation, the relationship can be reformulated as: Id*T=(Vcc−Vcm)*Cs. The amplifier block 350 can amplify a difference between Vin 310 and Vcm 315 in the third phase 402c, so that the generated Vout 235 is substantially zero in absence of a touch event (where Vin Vcm), or the generated Vout 235 manifests a non-zero Vsense 410 level in presence of a touch event (where Vin>Vcm).

As illustrated, embodiments can include, or can be in communication with, a phased switch controller 360. The phased switch controller 360 can output control signals to set the state of switches, such as K1 330, K2, 335, and K3 340. For example, the switches can be transistors, and the control signals can be used to turn the transistors ON or OFF. The phased switch controller 360 can include its own timing control (e.g., a clock, counter, etc.), or the phased switch controller 360 can be in communication with additional components that control timing of the signals output by the phased switch controller 360.

As noted above, when performing self-capacitor 105 sensing of touch events, the signal levels can be very low. For example, the difference in the level of Vin 310 at the end of the second phase 402b between touch and non-touch conditions can be very small. The detection in the third phase 402c depends on discerning between the touch and non-touch levels, which can depend on reliably canceling the base capacitance value of Cs 105. For example, presence of additional noise on either Vin 310 or Vcm 315 can reduce the headroom available for reliable differentiating between touch and non-touch conditions. Embodiments described herein include various novel techniques for reducing several conventional sources of detection-inhibiting noise in context of self-capacitance-based touch event sensing. The term "detection-inhibiting noise" is used herein to refer to types of noise that tend to reduce the effectiveness of self-capacitance-based sensing of touch events. For example, Cs 105 results from capacitively coupled display noise 225, but that noise is common to all channels (at least to adjacent channels) and will ultimately be eliminated by correlation, and is therefore not considered as detection-inhibiting noise. Some described techniques are directed to reducing detection-inhibiting noise in the discharge stage 302. Other described techniques are directed to reducing detection inhibiting noise in the sensing stage 303.

One way to reduce detection-inhibiting noise is to implement frequency-domain up-conversion (FUC) by changing the polarity of detection in different cycles, such as by toggling between polarities in each cycle. Use of FUC can effectively up-convert the signal being received from the touch sense channel, thereby shifting Vout 235 (i.e., the signal of interest) from the direct current (DC) domain into a higher frequency domain while leaving detection-inhibiting noise components in DC and facilitating low-frequency noise removal. Before discussing applications of such techniques to novel approaches herein, two examples are provided in which FUC is applied to conventional capacitive touch sensing approaches: a pre-charged capacitor (PCC) approach and a resistance-to-time conversion (RTC) approach.

Figure 5:
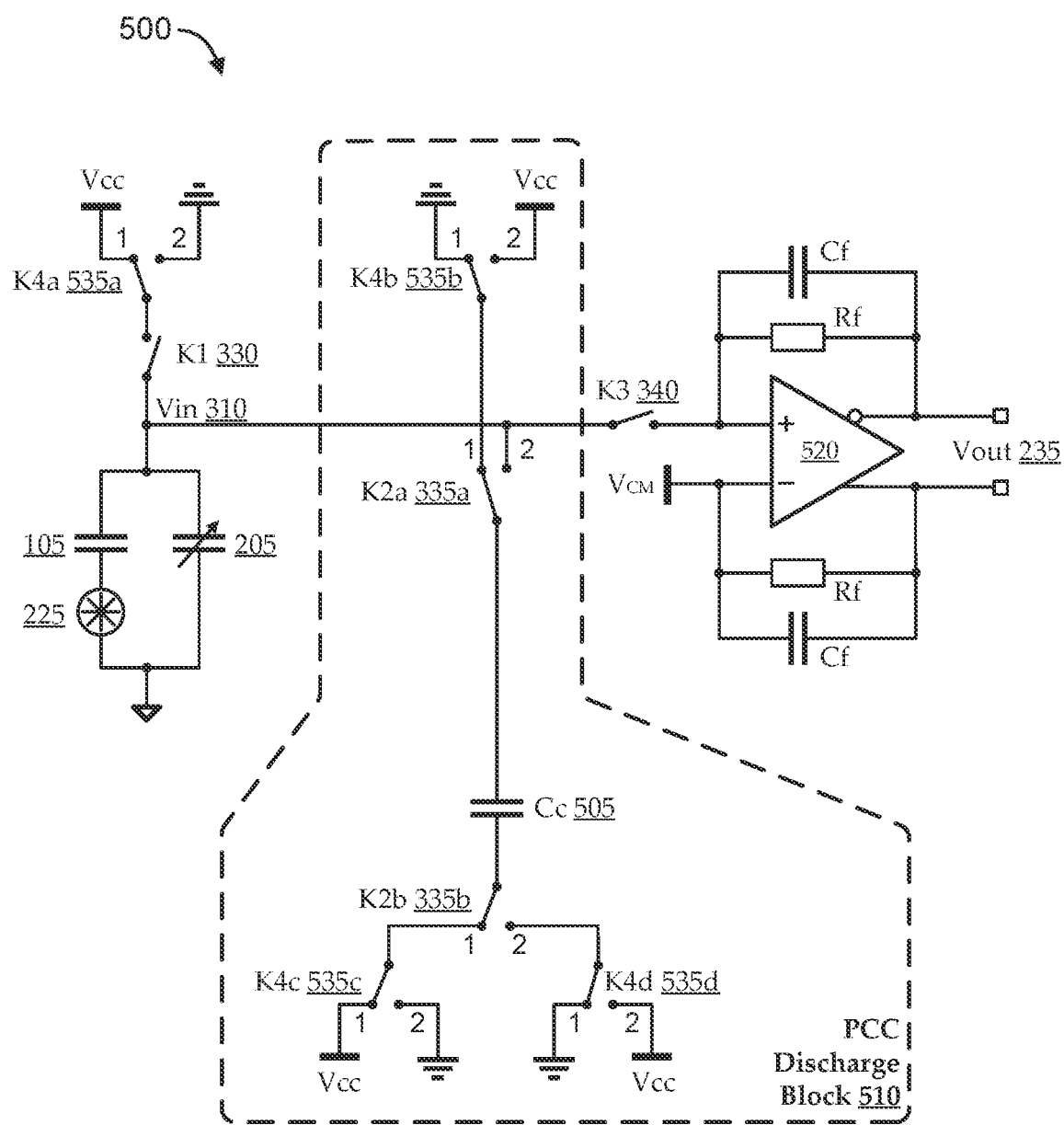
FIG. 5 shows a high-level block diagram of a self-capacitor sensing environment for discrete-time sensing using a conventional pre-charged capacitor (PCC) implementation of the discharge stage with frequency-domain up-conversion (FUC) for noise reduction.
Figure 6:
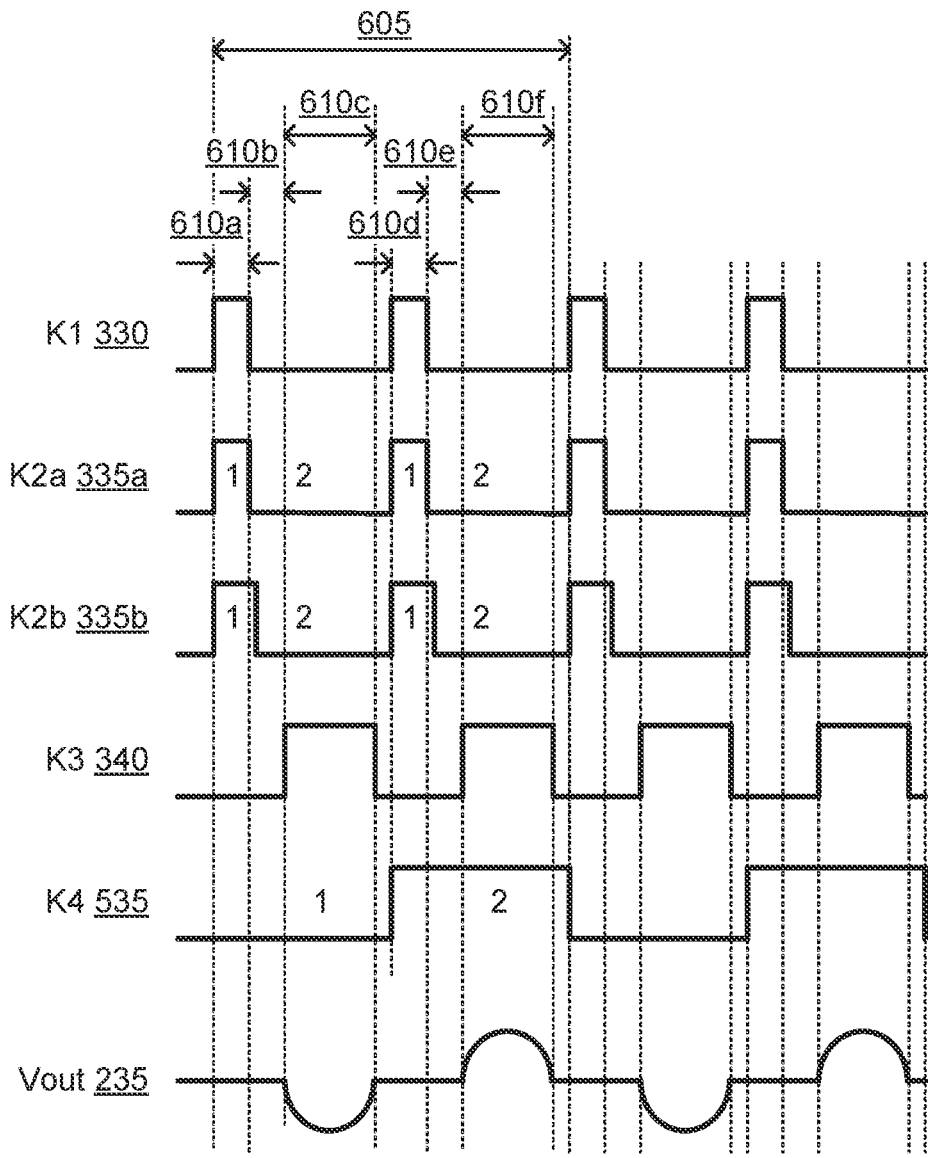
FIG. 6 shows simplified illustrative waveforms and timing at several phases of operation of the circuits of FIG. 5.

FIG. 5 shows a high-level block diagram of a self-capacitor sensing environment 500 for discrete-time sensing using a conventional pre-charged capacitor (PCC) implementation of the discharge stage 302 with frequency-domain up-conversion (FUC) for noise reduction. FIG. 6, described in parallel with FIG. 5, shows simplified illustrative waveforms and timing at several phases 610 of operation of the circuits of FIG. 5. As in FIG. 3, the environment 500 includes an AFE coupled with a capacitive channel of a touch panel array. The channel has a self-capacitance (Ci) represented by a self-capacitor (Cs) 105 (capacitively coupling display noise 225) in parallel with a touch capacitance 205 that varies from zero capacitance in absence of a local touch event to some non-zero capacitance in presence of a local touch event. The AFE is illustrated as implemented by a PCC discharge block 510 and a differential amplifier bock 520. The PCC discharge block 510 includes a charging capacitor (Cc) 505 configured to pre-charge during a first phase 610a for use in effectively discharging the channel self-capacitance (Ci).

In general, the FUC is implemented by setting switches K4 535 (shown as K4a 535a-K4d 535d) to position '1' (corresponding to a first polarity) in each first half of operating cycle 605, and setting switches K4 535 to position '2' (corresponding to a second, opposite polarity) in each second half of operating cycle 605. Otherwise, each half of cycle 605 can operate in an identical manner, according to three phases 610 (shown as phases 610a-610c) similar to the phases 402 described with reference to FIGS. 3 and 4. In a first phase 610a, switch K1 330 is closed, effectively charging the channel self-capacitance (Ci) (and node Vin 310). Concurrently, in the PCC discharge block 510, switches K2a 335a and K2b 335b are in position '1', such that switch K2b 335b pre-charges Cc 505 (in opposition to the charging of Ci) while switch K2a 335a keeps Cc 505 isolated from Vin 310. At the end of the first phase 610a, switch K1 330 opens and switches K2a 335a and K2b 335b switch to position '2'. This effectively leaves node Vin 310 floating at the charged level and coupled with both Ci and Cc 505 in parallel (i.e., Cs 105, Ctouch 205, and Cc 505 are coupled in parallel between Vin 310 and ground). Subsequently, in a third phase 610c, switch K3 340 closes to couple Vin 310 with an input of differential amplifier 520. As illustrated, the amplifier 520 can generate a differential Vout 235 as a function of a difference between Vin 310 and discharge reference level (Vcm) 315. As illustrated, phases 610a-610c can effectively repeat as phases 610d-610f with switches K4 535 set to position '2' to reverse the polarity of the charging and discharging operations. A simplified illustrative representation of Vout 235 is illustrated in FIG. 6. It can be seen that application of FUC to the PCC-based sensing approach effectively shifts Vout 235 from DC into a higher frequency domain (e.g., the frequency can be approximately 0.5 divided by the period of cycle 605).

While the approach described in FIGS. 5 and 6 can be effective, it tends to have several limitations. One limitation is that the addition of FUC requires that the circuit can toggle polarity of charge and discharge operations, which can add appreciable complexity to the circuits. Another limitation is that PCC-based approaches in general can consume an undesirable footprint. For example, the capacitance of Cc 505 is typically substantially less than that of Cs 105, so that coupling Cc 505 with Vin 310 sufficiently pulls charge to an extent that the amount of charge pulled away from Cs 105 (Qd) substantially settles Vin 210 to Vcm 215 within a desired amount of time (in absence of a touch event). In general, Qd=Id*T, where Id is the discharge current. For this to work properly, the capacitance of Cc 505 is typically selected to be approximately one-third of the capacitance of Cs 105 (e.g., if the capacitance of Cs 105 is 1 nF, Cc 505 can be approximately 330 pF). Thus, implementing such a PCC-based approach involves providing a Cc 505 for each channel (e.g., each instance of Cs 105 may have a corresponding instance of Cc 505). Particularly where there are tens of channels or more in a touch panel, and even further in context of higher self-capacitance values, the Cc 505 instances can consume a relatively large amount of silicon area, which may be undesirable for many applications. Another limitation is that PCC-based approaches rely on full settling of Cc 505 in each discharge cycle. Although such full settling can be beneficial (e.g., it can yield low sensitivity to clock jitter), it adds appreciable time to the readout of each Vout 235 (e.g., for each channel). As the number of channels increases, such an approach may not be capable of maintaining desired update rates. The addition of FUC can exacerbate this limitation, as it can be desirable to include multi-cycle discharge of Cc 505 for each precharge in order to facilitate reuse of a single Cc 505 for each read, and such a multi-cycle discharge can consume even more time per readout cycle.

Figure 7:
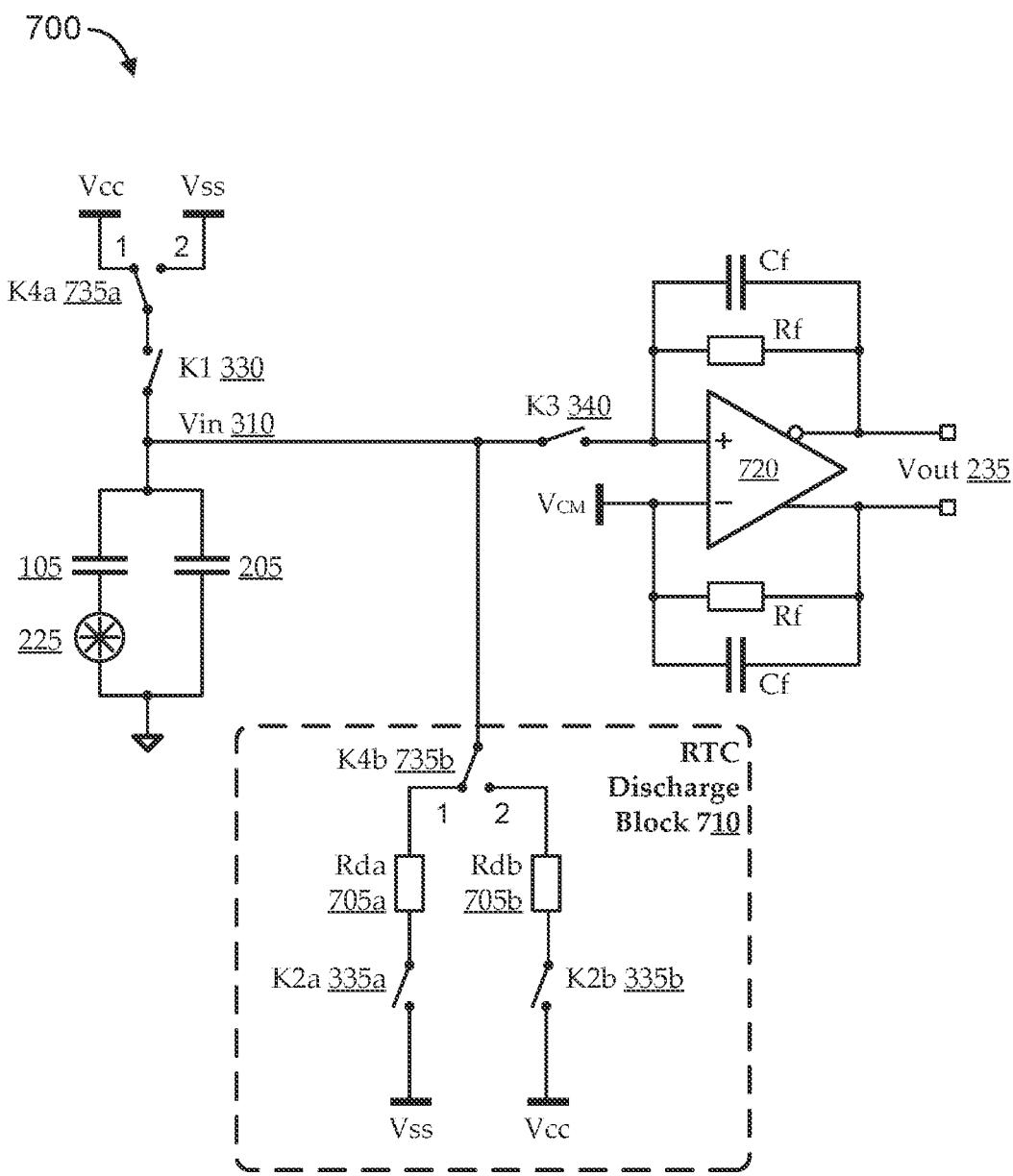
FIG. 7 shows a high-level block diagram of a self-capacitor sensing environment for discrete-time sensing using a conventional resistance-to-time conversion (RTC) implementation of the discharge stage with frequency-domain up-conversion (FUC) for noise reduction.
Figure 8:
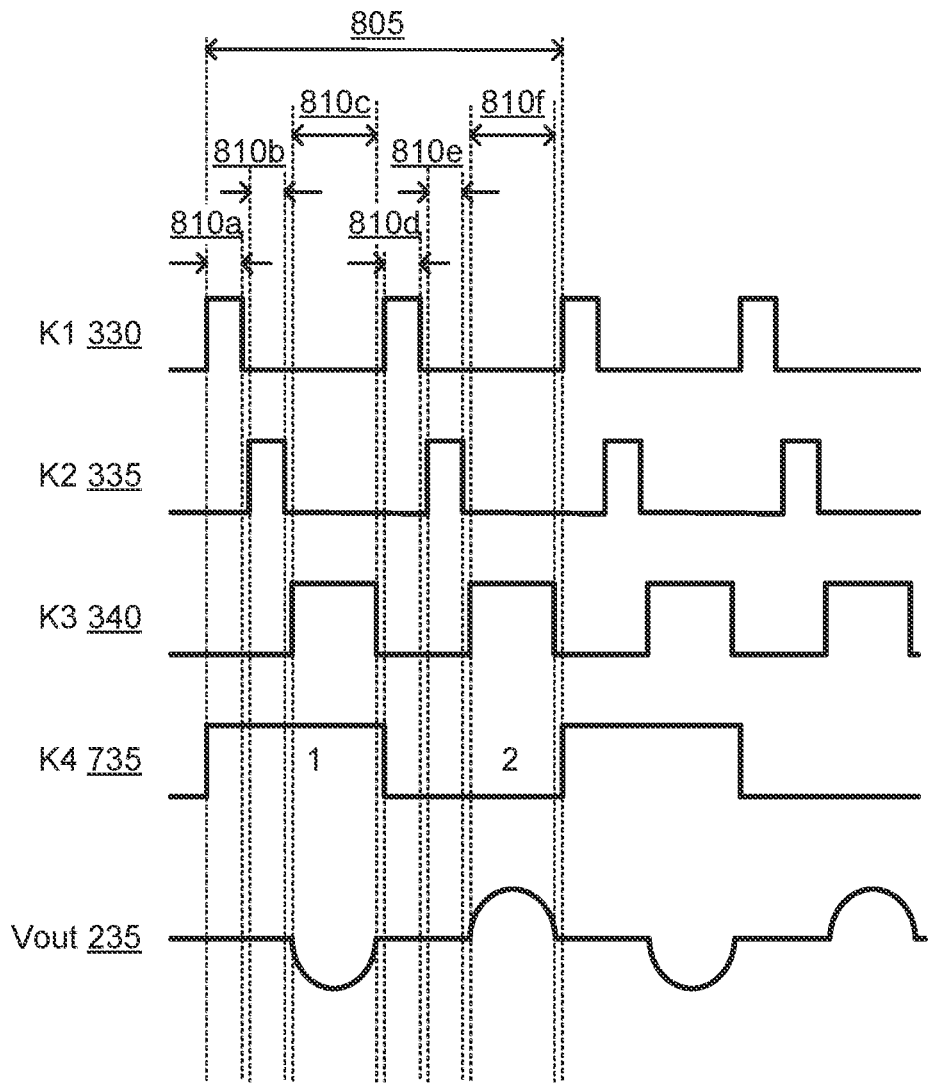
FIG. 8 shows simplified illustrative waveforms and timing at several phases of operation of the circuits of FIG. 7.

To avoid the large space penalty and other limitations associated with PCC-based approaches, some conventional implementations use a resistive approach to discharge Ci over a discrete amount of time. FIG. 7 shows a high-level block diagram of a self-capacitor sensing environment 700 for discrete-time sensing using a conventional resistance-to-time conversion (RTC) implementation of the discharge stage 302 with frequency-domain up-conversion (FUC) for noise reduction. FIG. 8, described in parallel with FIG. 7, shows simplified illustrative waveforms and timing at several phases 810 of operation of the circuits of FIG. 7. As in FIGS. 3 and 5, the environment 700 includes an AFE coupled with a capacitive channel of a touch panel array. The channel has a self-capacitance (Ci) represented by a self-capacitor (Cs) 105 (capacitively coupling display noise 225) in parallel with a touch capacitance 205 that varies from zero capacitance in absence of a local touch event to some non-zero capacitance in presence of a local touch event. The AFE is illustrated as implemented by a RTC discharge block 710 and a differential amplifier bock 720. The RTC discharge block 710 includes two discharge paths, each corresponding to a different operating polarity. Each path has a respective discharging resistor (Rd) 705 (illustrated as Rda 705a and Rdb 705b) configured to effectively discharge Ci.

In general, the FUC is implemented by setting switches K4 535 (shown as K4a 735a and K4b 735b) to position '1' (corresponding to a first polarity) in each first half of operating cycle 805, and setting switches K4 735 to position '2' (corresponding to a second, opposite polarity) in each second half of operating cycle 805. Otherwise, each half of cycle 805 can operate in an identical manner, according to three phases 810 (shown as phases 810a-810c) similar to the phases 402 described with reference to FIGS. 3 and 4. As described with reference to FIGS. 3 and 4 (and similar to the operation of FIGS. 5 and 6), K1 330 is closed during a first phase 810a, which couples Vin 210 with either Vcc or an opposite-polarity source voltage (Vss), thereby charging the Ci (Cs 105 and Ctouch 205 in parallel) to a charged level. Meanwhile, a respective switch K2 335 in both discharge branches (i.e., switch K2a 335a and switch K2b 335b) are open, so that the RTC discharge block 710 is effectively inactive. In a second phase 810b, switches K2 335 close (after opening switch K1 330), which couples one of Rda 705a or Rdb 705b with Vin 310, depending on the polarity setting implemented by switches K4 735. In this condition, Ci discharges to some discharge level (i.e., corresponding to the amount of capacitance of Ci, which corresponds to whether there is a touch event) through the coupled Rd 705. In a third phase 810c, switch K3 340 is closed, coupling Vin 310 to an input of differential amplifier bock 720. As illustrated, the amplifier 720 can generate a differential Vout 235 as a function of a difference between Vin 310 and discharge reference level (Vcm) 315. As illustrated, phases 810a-810c can effectively repeat as phases 810d-810f with switches K4 735 set to position '2' to reverse the polarity of the charging and discharging operations. A simplified illustrative representation of Vout 235 is illustrated in FIG. 8. It can be seen that, similar to the PCC-based approach, application of FUC to the RTC-based sensing approach effectively shifts Vout 235 from DC into a higher frequency domain.

It can be seen that the RTC based approach can be designed to produce a similar output to that of the PCC-based approach, except that the RTC discharge block 710 does not rely on multiple instances of large capacitors (as is the case with PCC-based implementations) and can be appreciably more space efficient, accordingly. However, because current and voltage are inversely proportional in a resistor, the amount of charge being discharged through Rd 705 changes over the second phase 810b along with the change in Vin 210. As such, the discharging provided by the RTC discharge block 525 causes the signal change represented by the change in Ci (as between touch and non-touch conditions) to leak through Rp 705, thereby producing a very large signal loss. Further, the RTC discharge block 710 can be highly sensitive to clock jitter in the second phase 810b. Clock noise can result in slight changes in the width of the pulse used to control the on and off timing of K2 335, which can effectively change T 805. It is known that capacitor current (Ic) is related to its capacitance and a change in voltage over time: Ic=C*(dV/dt). If there is added pulse-width time due to clock jitter (Tj), for a discharge current (Id), the voltage error induced at Vin 310 from the jitter (Vin_e) can be described as: Vin_e=Tj*Id/(Cs+Ctouch).

Figure 9:
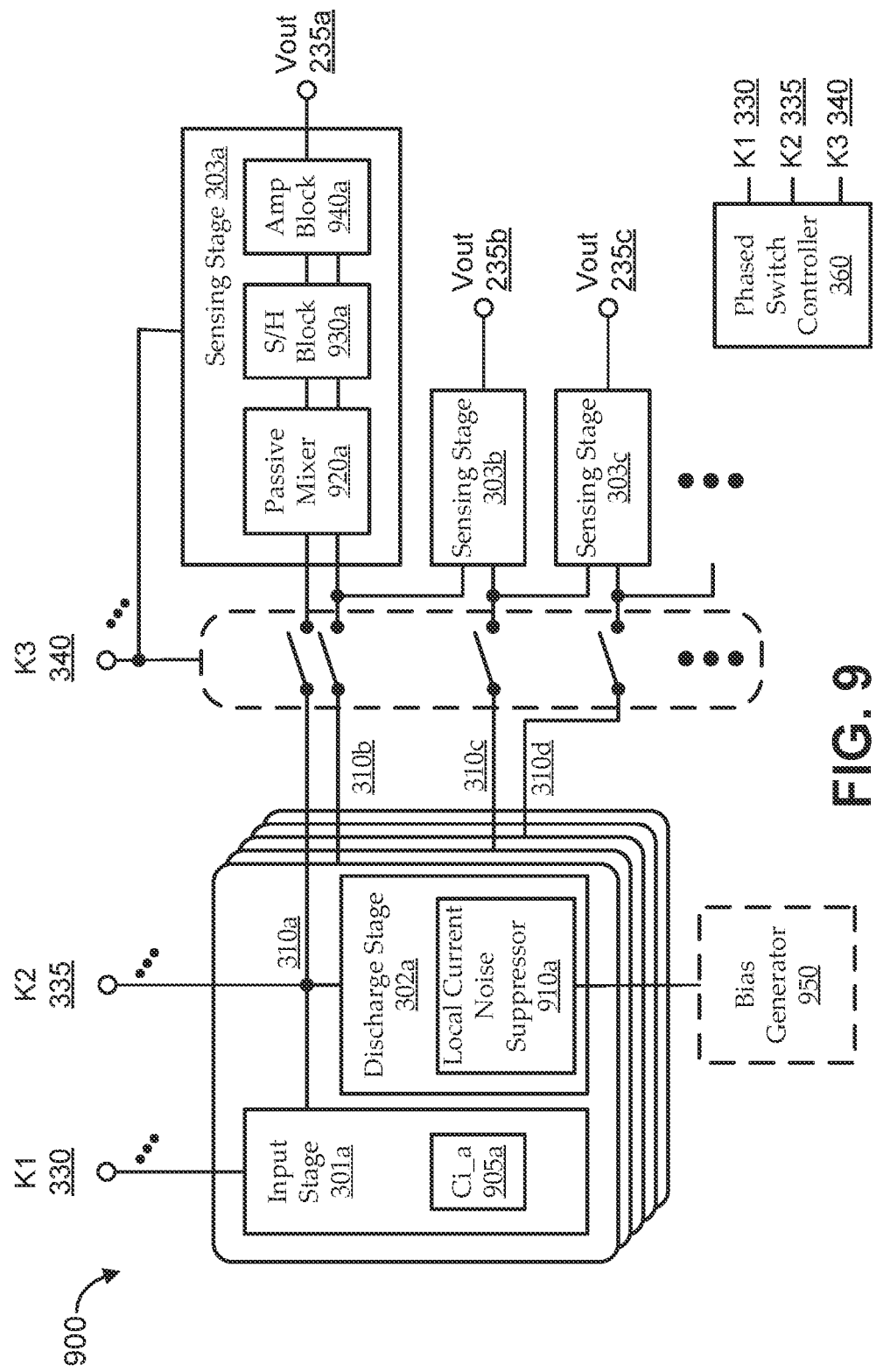
FIG. 9 shows a simplified block diagram of a low-noise discrete-time self-capacitor sensing system, according to embodiments described herein.

Embodiments described herein provide several novel features to reduce detection-inhibiting noise (i.e., to yield a high signal to noise ratio (SNR) for detection). To illustrate such features, FIG. 9 shows a simplified block diagram of a low-noise discrete-time self-capacitor sensing system 900, according to embodiments described herein. As described with reference to FIG. 3, the sensing environment 300 for a particular touch sense channel (i.e., a particular row line or column line of a touch panel array) was illustrated as including an input stage 301, a discharge stage 302, and a sensing stage 303. Further, as described with reference to FIG. 3, the timing of the phases is controlled by a phased switch controller 360. The sensing system 900 is illustrated as including the same stages, but with the additional context of multiple touch sense channels (e.g., tens of row lines and column lines) of a touch panel array each being read out through an AFE.

In particular, FIG. 9 assumes a touch panel array having N touch sense channels (N is an integer greater than one). As a convention, the touch sense channels can correspond to labels 'a'-'n' appended to the ends of reference designators. For example, each of the N touch sense channels can be associated with a respective input stage 301, which can be referred to herein according to this stated convention as input stages 301a-301n. To avoid overcomplicating FIG. 9, only a limited number of instances of each element of the figure are explicitly shown. For example, only input stage 301a is explicitly shown (corresponding to the input stage 301 for a first touch sense channel, according to the stated convention), but the figure intends to implicitly represent N nominally identical instances, input stages 301a-301n.

Each of the N instances of input stage 301 includes a respective total channel self-capacitance (Ci) 905, which represents parasitic capacitance on the channel from capacitively coupled display noise (i.e., a base amount of self-capacitance, Cs) with additional touch capacitance (i.e., Ctouch) in presence of a touch event. As described above (e.g., with reference to FIGS. 3 and 4), readout of the respective Ci 905 for each touch sense channel follows a sequence of phases. For example, the respective Ci 905 is charged to set a respective Vin 310 to a charging voltage level during a first phase (e.g., based at least on control timing for switch K1 330). In a second phase (e.g., based at least on control timing for switch K2 335), Ci is discharged for some amount of time, leaving the respective Vin 310 at a discharge voltage level. As described above, the sensing system 900 is designed so that a change in Ci 905 between touch and non-touch conditions causes a change in discharge rate, which manifests as a detectable difference in discharge voltage level on Vin 310 at the end of the second phase. Thus, after some discrete discharge time (e.g., T 405 of FIG. 4), when K2 335 is opened, the remaining charge on Ci (and the corresponding level of Vin 310) is detectably different between touch event and non-touch event conditions.

As illustrated, the discharging of Ci can be through a respective one of N instances of a discharge stage 302 associated with the channel, which can be coupled with a respective one of N instances of a noise-suppressed discharge current generator 910 associated with the channel. In some embodiments, groups of instances of the noise-suppressed discharge current generator 910 share a shared generator 950. In some implementations, a single instance of the shared generator 950 is shared by all N instances of the noise-suppressed discharge current generator 910 (i.e., by all touch sense channels). In other implementations, each of multiple instances of the shared generator 950 is shared by a respective subset of the N instances of the noise-suppressed discharge current generator 910. Embodiments of the noise-suppressed discharge current generator 910 and shared generator 950 are discussed in more detail below (e.g., in FIGS. 10, 11 14, and 15).

In a third phase (e.g., based at least on control timing for switch K3 340), the discharge voltage level represented by the respective Vin 310 at the end of the second phase is converted to a respective Vout 235 through a respective instance of the sensing stage 303. As illustrated, each instance of sensing stage 303 can include a respective instance of a passive mixer 920, a sample and hold (S/H) block 930, and an amplifier (Amp) block 940. Embodiments of the sensing stage 303, and its various components, are discussed in more detail below (e.g., in FIGS. 12, 13, 15, and 16).

The sensing system 900 is illustrated in a configuration for differential sensing. As such, embodiments can include N−1 instances of the sensing stage 303 to support the N touch sense channels (only three sensing stages 303a-303c of N−1 sensing stages 303a-303(n−1) are explicitly shown). For example, Vin 310a and Vin 310b (for first and second touch sense channels) are used as differential inputs to a first sensing stage 303a; Vin 310b and Vin 310c (for second and third touch sense channels) are used as differential inputs to a second sensing stage 303b; etc. Any suitable alternative arrangement can be used to provide sensing stages 303 with differential inputs. For example, only N/2 sensing stages can be used by assigning Vin 310a and Vin 310b to differential inputs of a first sensing stage 303a, Vin 310c and Vin 310d to differential inputs of a second sensing stage 303b, etc. In other embodiments, some or all of the sensing stage 303 instances can be configured as single-ended (i.e., non-differential). For example, N instances of the sensing stage 303 are used, each having one input coupled with a respective one of the N touch sense channels, and the other input coupled with a reference voltage (e.g., Vcm). An example of such a single-ended implementation is described in FIG. 16.

Figure 10:
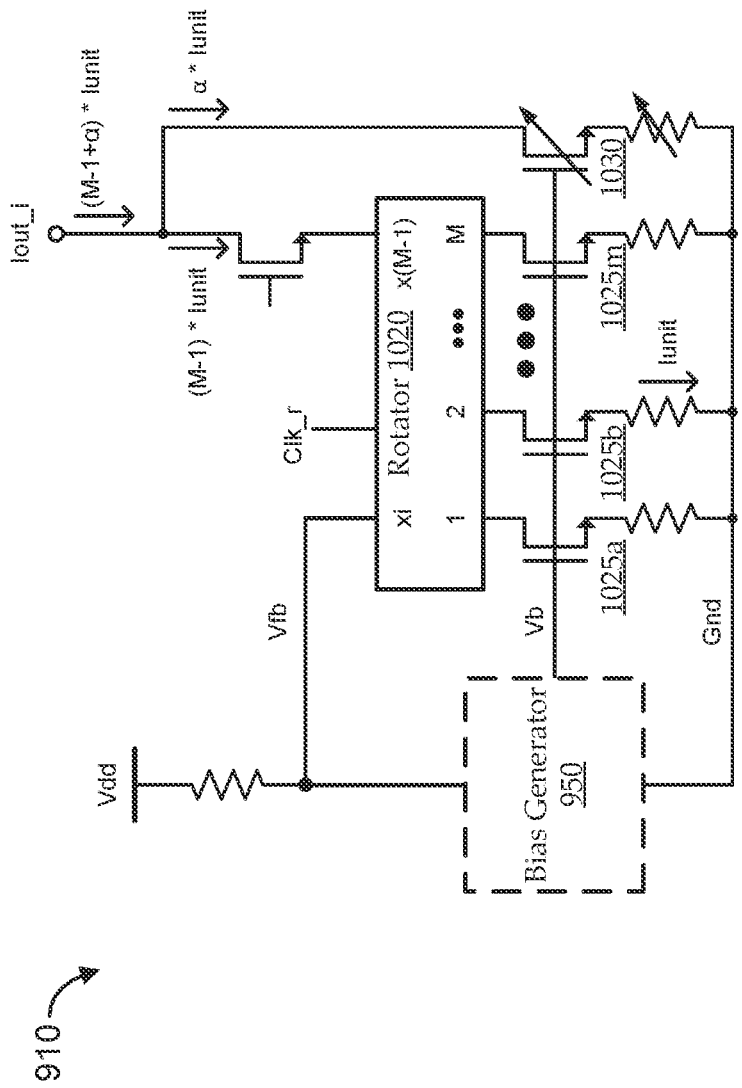
FIG. 10 shows a circuit block diagram of an illustrative instance of a noise-suppressed discharge current generator, according to several embodiments described herein.

FIG. 10 shows a circuit block diagram of an illustrative instance of a noise-suppressed discharge current generator 910, according to several embodiments described herein. As illustrated, the noise-suppressed discharge current generator 910 can include a rotator 1020 and a bias generator 950. The bias generator 950 is configured to generate a bias voltage (Vb) for multiple current sources of the noise-suppressed discharge current generator 910 based on feedback (Vfb) from one or more of the current sources 1025 of the noise-suppressed discharge current generator 910. In some implementations, the bias generator 950 is completely local to the noise-suppressed discharge current generator 910. For example, each instance of the noise-suppressed discharge current generator 910 includes an instance of the bias generator 950. In other implementations, some or all of the bias generator 950 is implemented separately from the noise-suppressed discharge current generator 910 (and electrically coupled therewith). For example, a single instance of the bias generator 950 is coupled with, and received feedback from, multiple instances of the noise-suppressed discharge current generator 910. Some embodiments of the bias generator 950 generate Vb as a constant bias voltage. Other embodiments of the bias generator 950 generate Vb according to a particular biasing profile, such as a substantially constant-slope ramp. For example, each instance of the bias generator 950 can include, or multiple instances of the bias generator 950 can share, a ramp generator to generate a constant-slope ramp used by the bias generator 950 to generate its Vb.

As illustrated, the noise-suppressed discharge current generator 910 can include M current sources 1025 (illustrated as current sources 1025a-1025m), all biased by the same Vb. The current sources 1025 can be implemented in any suitable manner. Each current source 1025 is represented as a transistor in series with a resistor. Each transistor has a gate coupled with Vb, a drain coupled with a respective source port of the rotator 1020, and a source coupled to ground (Gnd) via the resistor. The rotator 1020 is configured to have M source ports (labeled '1'-'M'), one feedback port (labeled 'xi'), and a drain port (labeled 'x(M−1)'). M can be any positive integer greater than one.

The rotator 1020 can be driven by a clock (Clk_r). Each rotation has M Clk_r cycles. In each ith cycle of the M Clk_r cycles, an ith one of the M source ports is coupled with the feedback port, and the other M−1 source ports are coupled with the drain port. For example, in a first Clk_r cycle, the first source port ('1') is coupled with the feedback port, so that current source 1025a is coupled in feedback with the bias generator 950. In the illustrated configuration, a current at the feedback port corresponds to the current at the first source port, and that current is converted to a feedback voltage by a resistor coupled with a local source voltage (Vdd). Meanwhile, the other source ports ('2'-'M') are coupled with the drain port so that the current is sourced through the rotator 1020 by the M−1 current sources 1025 other than current source 1025a (i.e., by current sources 1025b-1025m). In this configuration, the feedback loop with current source 1025a seeks to cancel out noise contributions from current source 1025a. As such, the current generated by current source 1025a is effectively based on Vb after noise cancellation, which corresponds to a base bias voltage less some amount of canceled noise on the first current source 1025a (Vn_ch1). Because Vb is shared by all current sources 1025, all current sources 1025 will be biased to generate a current in the first Clk_r cycle that is reduced by the cancelled Vn_ch1. However, each of the other M−1 current sources 1025 will also contribute its own noise during the first Clk_r cycle. As such, the total current generation noise for the first Clk_r cycle will include the sum of noise contributions from current sources 1025b-1025m less M−1 times the noise contribution from current source 1025a. For example, the total current generation noise for the first Clk_r cycle can be expressed as:

Total_noise_cycle1=sum($Vn\_ch2, \ldots, Vn\_chM$)−($Vn\_ch1*(M-1)$).

By extension, the total current generation noise for any ith Clk_r cycle (after the first Clk_r cycle) can be expressed as:

Total_noise_cyclei=sum($Vn\_ch1, \ldots, Vn\_ch(i-1), Vn\_ch(i+1), \ldots, Vn\_chM$)−($Vn\_chi*(M-1)$).

After M Clk_r cycles, it can be seen that the noise from each current source 1025 is effectively canceled out, such that the total current generation noise over the entire period of Clk_r is zero, as follows:

Total_noise=[sum($Vn\_ch1, \ldots, Vn\_chM$)*(M-1)]−[sum($Vn\_ch1, \ldots, Vn\_ch20$)*(M-1)]=0

Thus, as the rotator 1020 rotates through all the current sources 1025, any noise from the current sources 1025 is canceled, and the resulting current is effectively M−1 times the unit current (Iunit) of each individual current source 1025 as biased by Vb. The period of the rotation is much shorter than each readout period, such that the rotator 1020 may rotate through all M current sources 1025 many times during a single discharge phase (i.e., phase 402b of FIG. 4). As such, the ith discharge current (Iout_i) produced by any ith instance of the noise-suppressed discharge current generator 910 (and, thus, by any ith instance of the discharge stage 302 that includes the noise-suppressed discharge current generator 910) is (M−1)*Iunit. For example, referring to FIG. 9, node Vin 310a is coupled with the first instance of discharge stage 302a that includes the first instance of noise-suppressed discharge current generator 910a. When the discharge stage 302a is activated during the discharge phase (e.g., by closing switch K2 335), node Vin 310a is coupled with the Iout a node (i.e., corresponding to the illustrated Iout_i node for the ith instance, but referred to as the Iout a node to correspond to the first instance) to generate a discharge current of (M−1)*Iunit.

In some embodiments, as illustrated, the noise-suppressed discharge current generator 910 further includes a trim current source 1030 in a parallel current path with the rotator 1020. The trim current source 1030 can be biased by the same Vb but can be configured to draw an adjustable amount of current, represented as α*Iunit. Typically, α represents a fractional value, so that the trim current source 1030 facilitates fine tuning of the discharge current. M can be selected to coarsely determine the discharge current as (M−1)*Iunit, and α can be adjusted to fine-tune the discharge current to (M−1+α)*Iunit. For example, if M is 20, and α is 0.4, the noise-suppressed discharge current generator 910 can be configured to generate a discharge current of 19.4*Iunit.

Figure 11:
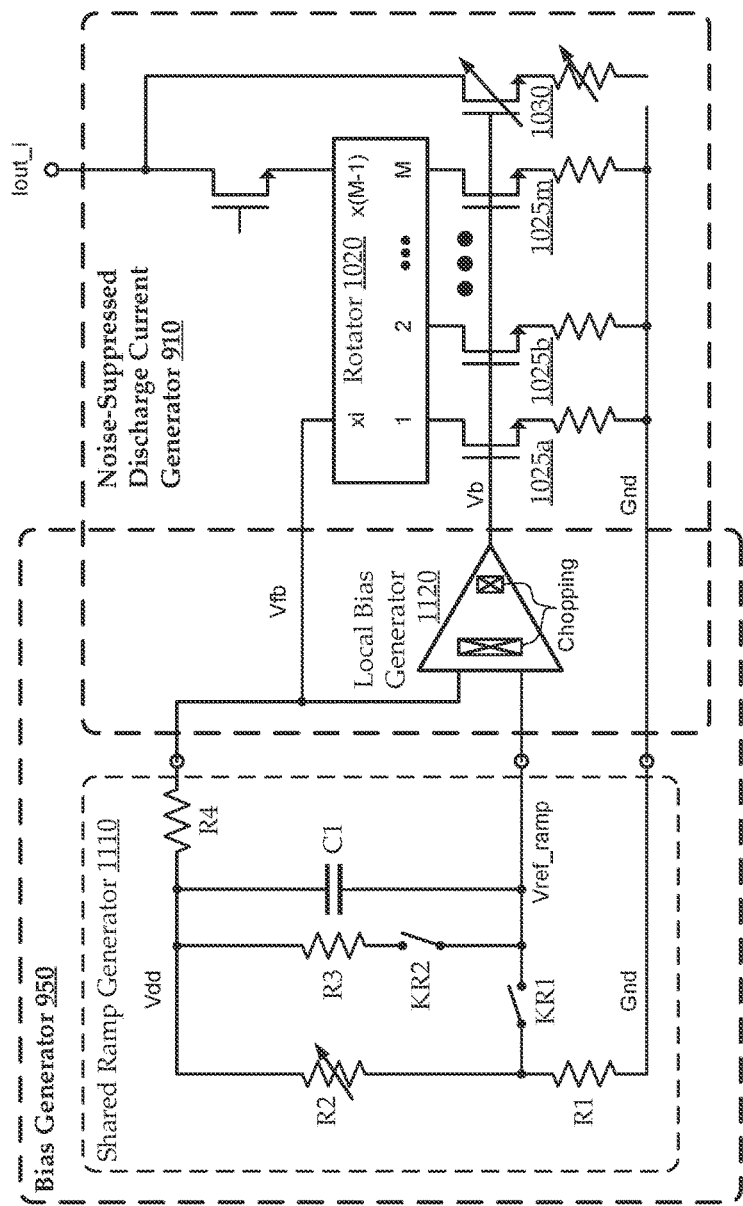
FIG. 11 shows a circuit block diagram of another illustrative instance of a noise-suppressed discharge current generator coupled with a shared ramp generator, according to several embodiments described herein.

FIG. 11 shows a circuit block diagram of another illustrative instance of a noise-suppressed discharge current generator 910 coupled with a shared ramp generator 1110, according to several embodiments described herein. The rotator 1020, current sources 1025, trim current source 1030, and associated circuits of the noise-suppressed discharge current generator 910 operate in the same manner described with reference to FIG. 10. As illustrated, the bias generator 950 includes a shared ramp generator 1110 and a local bias generator 1120. As described with reference generally to the bias generator 950 of FIG. 10, the local bias generator 1120 in FIG. 11 generates Vb for biasing the current sources 1025 (e.g., and the trim current source 1030).

Embodiments of the local bias generator 1120 are implemented as an operational amplifier. For example, the operational amplifier outputs Vb as a function of comparing a bias reference voltage generated by the bias generator 950 with the feedback voltage (Vfb) from the rotator 1020. In some embodiments, the operational amplifier is implemented with chopping to help reduce noise from the operational amplifier itself (e.g., so-called "flicker" noise of the operational amplifier). As used herein, "chopping" refers to toggled swapping of differential inputs or outputs so that a signal is moved to a higher frequency (based on the frequency of the toggling) and lower-frequency noise can effectively be canceled. As illustrated, the operational amplifier can be implemented with chopping at its inputs and outputs. Although this particular implementation of the local bias generator 1120 as an operational amplifier with input/output chopping is shown only in context of FIG. 11 (e.g., in specific context of the illustrated rotator 1020 configuration, shared ramp generator 1110 configuration, etc.), such an implementation of the local bias generator 1120 can be incorporated into any other embodiments described herein.

In some embodiments, the bias generator 950 generates the bias reference voltage as a constant reference voltage, so that the local bias generator 1120 generates Vb as a substantially constant bias voltage and the noise-suppressed discharge current generator 910 generates a substantially constant discharge current. In other embodiments, the bias generator 950 generates the bias reference voltage to have a non-constant profile (e.g., according to a linear function, a non-linear function, etc.), so that the local bias generator 1120 generates Vb as a non-constant bias voltage and the noise-suppressed discharge current generator 910 generates a non-constant discharge current. For example, the illustrated shared ramp generator 1110 is configured to generate the bias reference voltage as a ramp reference voltage (Vref ramp), which follows a substantially constant negative slope. Accordingly, the local bias generator 1120 generates Vb as a ramp-down bias voltage and the noise-suppressed discharge current generator 910 generates a ramp-down discharge current (i.e., a ramp-generated discharge current). In particular, shared ramp generator 1110 is configured so that the resulting ramp-generated discharge current produced by the noise-suppressed discharge current generator 910 is substantially large at the beginning of each discharge phase (i.e., second phase 402b of FIG. 4) and is substantially small at the end of each discharge phase.

For example, referring to the context of FIG. 3, embodiments can configure the shared ramp generator 1110 so that the total discharge current over each discharge phase causes Vin 310 to settle to Vcm 315 by the end of the discharge phase in the absence of a touch event. In some embodiments, the ramp-generated discharge current toward the beginning of each discharge phase is high enough to reduce any noise contribution from the ramp-generated discharge current itself. Further, because Vin 210 is relatively high at the beginning of each discharge phase, a higher voltage drop can be afforded across Rp, which supports use of higher discharge current at the start of the discharge phase. As noted above, voltage error induced at Vin 210 from clock jitter in the discharge phase is related to the discharge current (i.e., a higher discharge current over the same jitter time produces a larger error on Vin 310). The relatively low ramp-generated discharge current toward the end of each discharge phase reduces the impact of clock jitter on detection.

Returning to FIG. 11, the illustrated shared ramp generator 1110 includes a network of a capacitor (C1), four resistors (R1-R4), and two ramp switches (KR1 and KR2). KR1 is closed in a first ramp generation phase (e.g., which can correspond in time with the first phase 402a of FIG. 4 used to charge Ci). This couples C1 between a ramp source voltage (Vdd) and Vref ramp. The voltage at Vref ramp is some fraction of Vdd controlled by a voltage divider of resistors R1 and R2 (which are coupled between Vdd and ground). After charging C1, the voltage across C1 is the difference between Vdd and Vref ramp. In a second ramp generation phase, KR1 is opened and KR2 is closed. This couples C1 with R3 in parallel, so that C1 is discharged through R3, causing Vref ramp to climb in a substantially linear fashion to Vdd. The timing of the second ramp generation phase can correspond to the timing of the discharge phase (e.g., the second phase 402b of FIG. 4) used to discharge Ci. For example, the discharge of C1 can begin concurrent with or slightly before the beginning of the discharge phase (e.g., prior to closing switch K2 335 of FIG. 4 or 9) and can end concurrent with or slightly after the end of the discharge phase.

Resistor R4 is coupled with C1, so that the substantially linear ramp-down current profile of C1 is reflected by the current profile through R4. R4 is also coupled with the feedback path to the local bias generator 1120, so that the output voltage of the local bias generator 1120 (i.e., Vb) has a corresponding substantially linear ramp-down voltage profile. Thus, the noise-suppressed discharge current generator 910 can generate the ramp-generated discharge current to be proportional to (and following the ramp-down profile of) the current discharging from C1. As noted above, the same shared ramp generator 1110 instance can be coupled with multiple instances of the local bias generator 1120 (each local to a respective instance of the noise-suppressed discharge current generator 910), such that a same ramp-down bias current and Vref ramp can be used by multiple local bias generators 1120 to generate their respective bias voltages. Other descriptions and embodiments of ramp-biased current generation are provided in U.S. patent application Ser. No. 18/164,605, filed on Feb. 5, 2023, titled "SELF-CAPACITOR SENSING FOR CAPACITIVE TOUCH PANELS," which is incorporated by reference herein in its entirety.

Figure 12:
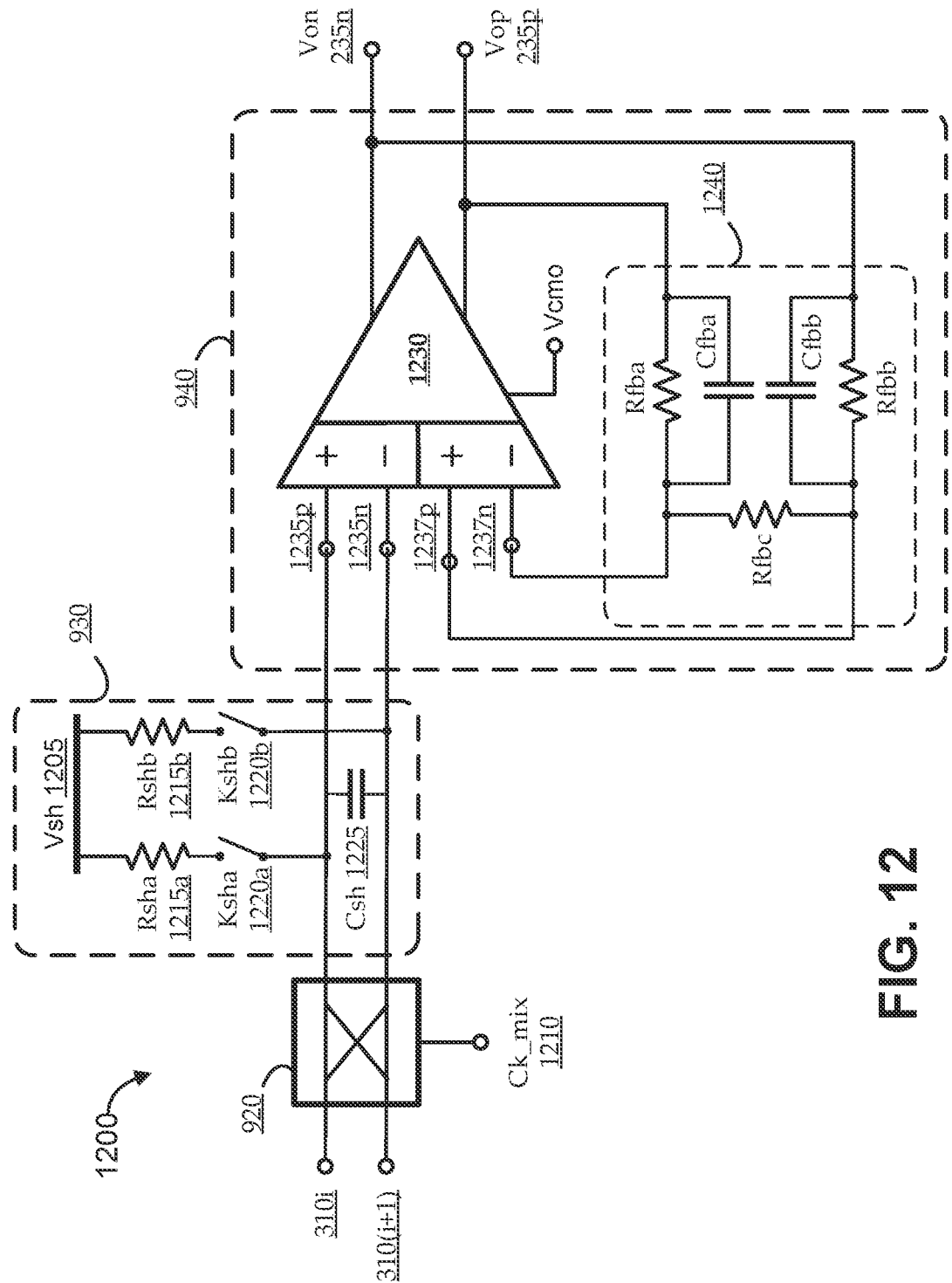
FIG. 12 shows a circuit block diagram of an illustrative implementation of a differential sensing stage, according to various embodiments described herein.
Figure 13:
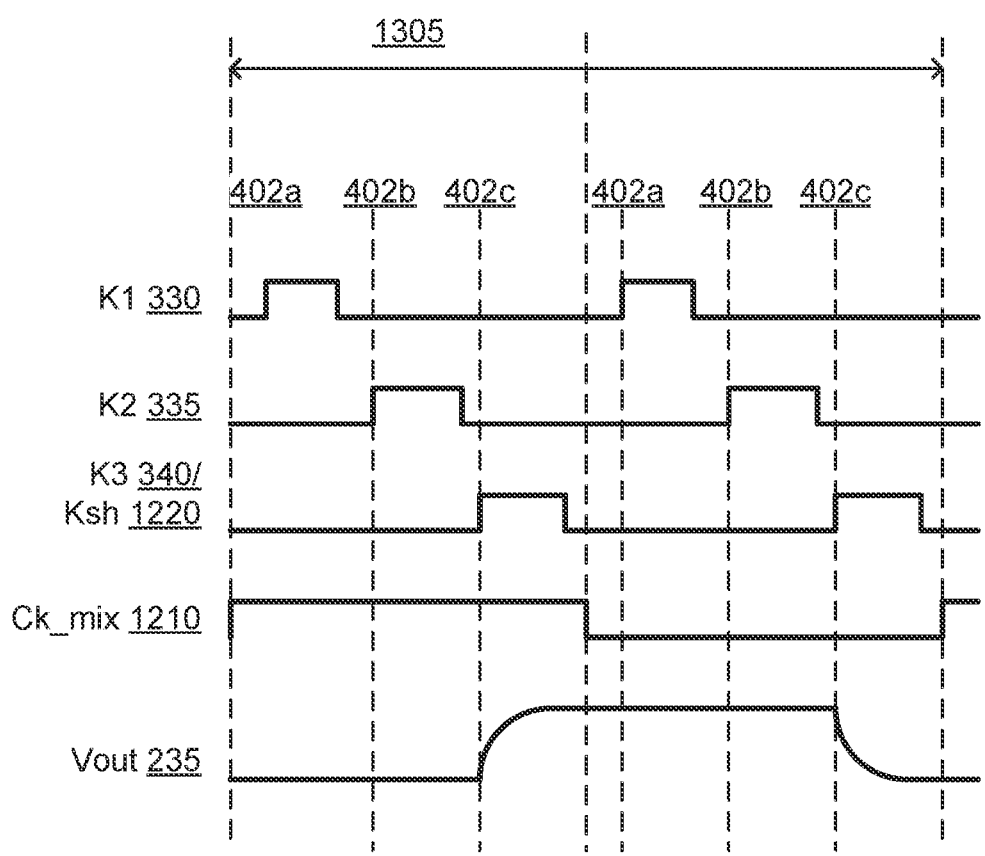
FIG. 13 shows illustrative plots and timing of several signals relevant to the operation of the circuit of FIG. 12.

FIG. 12 shows a circuit block diagram of an illustrative implementation of a differential sensing stage 1200, according to various embodiments described herein. For added clarity, FIG. 13 shows illustrative plots and timing of several signals relevant to the operation of the circuit of FIG. 12. The differential sensing stage 1200 can be an implementation of an instance of the sensing stage 303 of FIG. 9 and/or FIG. 3. Consistent with the description of FIG. 9, the differential sensing stage 1200 is illustrated as including a passive mixer 920, a sample and hold block 930, and an amplifier block 940. For example, though not explicitly labeled as such, the differential sensing stage 1200 can represent an ith instance of sensing stage 303i having associated ith instances of the passive mixer 920i, sample and hold block 930i, and amplifier block 940i. The differential sensing stage 1200 can receive differential input signals corresponding to the respective Vin 310 nodes of two channels, generally referred to as Vin 310i for an ith channel and Vin 310(i+1) for an (i+1)th channel.

As described herein, the base value of self-capacitance for any touch sense channel is based on display noise capacitively coupled from an integrated display panel onto that channel (e.g., onto that particular row line or column line of the touch panel array). It is generally assumed that, while the display noise can vary across the display panel, it tends to have very little local variance. For example, it can be assumed that the display noise coupled onto two directly adjacent channels of the touch panel array will be similar enough to be treated as common-mode noise by sense circuitry described herein. Similarly, channels that are proximate, but are not directly adjacent may experience capacitively coupled display noise that is sufficiently similar to be treated as common-mode noise by sensing circuits herein. FIG. 12 refers to differentially received channels generally as any ith channel and (i+1)th channel, which are considered as "adjacent." The term "adjacent" in such contexts generally means channels (e.g., and any associated metal row or column lines, mutual capacitors, etc.) which are directly adjacent to each other on the touch panel, within several rows of each other on the touch panel, or otherwise sufficiently proximate to each other so that the display noise coupled to those channels can be treated as common-mode noise for cancelation purposes described herein. Thus, in some embodiments, the ith channel and (i+1)th channels are directly adjacent channels of a touch panel array (e.g., directly adjacent row lines or directly adjacent column lines). In other embodiments, the ith channel and (i+1)th channels are not directly adjacent, but are proximate enough to experience sufficiently common-mode display noise for purposes of cancelation by sense circuitry described herein.

Embodiments of the passive mixer 920 are implemented as a chopper that toggles its input-output paths according to a mixer clock (Ck_mix) 1210. Each period of Ck_mix 1210 includes two cycles: in each first cycle, the passive mixer 920 is in a pass-through configuration whereby it couples a first input with a first output and couples a second input with a second output; in each second cycle, the passive mixer 920 is in a swapped configuration in which it couples the first input with the second output and couples the second input with the first output. In some embodiments, each readout cycle of an ith touch sense channel can be performed as two readout cycles, each toggling the passive mixer 920 between the pass-through and swapped configurations. For example, FIG. 13 illustrates a full Ck_mix 1210 period 1305 representing a double readout cycle. The first half of the period 1305 is a first readout cycle in which K1 330, K2 335, and K3 340 follow the timing described at least with reference to FIG. 4 and Ck_mix 1210 is HIGH (corresponding to a first, e.g. pass-through, setting); the second half of the period 1305 is a second readout cycle which can be identical to the first (i.e., K1 330, K2 335, and K3 340 follow the timing described at least with reference to FIG. 4), except that Ck_mix 1210 is LOW (corresponding to a second, e.g. swapped, setting).

The differential outputs of passive mixer 920 can be passed to the sample and hold (S/H) block 930. As illustrated, the sample and hold block 930 can include two branches, each coupled between a respective one of the outputs of the passive mixer 920 and a sample reference voltage (Vsh) 1205. Each branch can be nominally identical, including a respective S/H resistor (Rsh) 1215 and a respective S/H switch (Ksh) 1220 (i.e., a first branch includes a first S/H resistor (Rsha 1215$a$) and a first switch (Ksha 1220$a$), and a second branch includes a second S/H resistor (Rshb 1215$a$) and a second switch (Kshb 1220$b$)). Embodiments further include a sample and hold capacitor (Csh) 1225 coupled between the outputs of the passive mixer 920.

The S/H switches 1220 are switched according to the same timing as instances of K3 340, such as illustrated by FIGS. 4 and 13. For example, in a first readout cycle, Ck_mix 1210 sets the passive mixer 920 to a pass-through configuration. Referring to FIG. 13, in a third phase 402$c$ of the first readout cycle, switch K3 340 is closed. This causes the discharged voltage level of the ith channel (i.e., the voltage at node Vin 310$i$) to pass through an upper input and output of the passive mixer 920, and the discharged voltage level of the (i+1)th channel (i.e., the voltage at Vin 310($i$+1)) to pass through a lower input and output of the passive mixer 920. Concurrently, the two S/H switches Ksh 1220 are closed. This causes the voltage at node Vin 310$i$ to be sampled in the first branch of the sample and hold block 930 as a voltage across Rsha 1215$a$ (i.e., a difference between Vsh 1205 and the voltage at node Vin 310$i$) and the voltage at node Vin 310($i$+1) to be sampled in the second branch of the sample and hold block 930 as a voltage across Rshb 1215$b$ (i.e., a difference between Vsh 1205 and the voltage at node Vin 310($i$+1)). Csh 1225 charges to the voltage difference (i.e., the differential voltage) between the branches of the sample and hold block 930, and Csh 1225 holds this differential voltage after switches K3 340 and Ksh 1220 are opened (e.g., until the next third phase 402$c$). A second readout cycle can proceed in a substantially identical manner, except with Ck_mix 1210 setting the passive mixer 920 to the swapped configuration (e.g., as illustrated in the second half of the period 1305 in FIG. 13). Again, in the third phase 402$c$ of the second readout cycle, switch K3 340 and the two S/H switches Ksh 1220 are closed. This causes the discharged voltage levels of the ith and (i+1)th channels to swap through the passive mixer 920, such that the voltage at node Vin 310$i$ is sampled in the second branch of the sample and hold block 930, and the voltage at node Vin 310($i$+1) is sampled in the first branch of the sample and hold block 930. Thus, in each first readout cycle, Csh 1225 effectively holds a sampled value of Vin 310$i$-Vin 310($i$+1); and in each second readout cycle, Csh 1225 effectively holds a sampled value of Vin 310($i$+1)-Vin 310$i$.

In this way, the passive mixer 920 and the sample and hold block 930 operate together to effectively produce up-conversion of the signal by frequency-domain up-conversion (FUC). As described with reference to FIGS. 5-8 above, application of FUC into conventional PCC-based and/or RTC-based approaches tends to involve doubling at least the discharge circuit and swapping between the copies in each half-period. For example, each instance of the sensing circuit has two copies of at least the discharge circuit, one copy configured for one polarity, and one copy configured for an opposite polarity. The implementation in FIG. 12 of the passive mixer 920 and the sample and hold block 930 provides up-conversion of the channel signals without relying on doubling of discharge circuitry and swapping between copies at different polarities.

The differential output of the sample and hold block 930 is effectively an up-converted, mixed version of voltage levels of two (e.g., adjacent) touch sense channels corresponding to their self-capacitances. This differential output from the sample and hold block 930 can be passed to differential inputs of the amplifier block 940. The amplifier block 940 can be implemented with any suitable type of amplifier or amplifiers. In some implementations (not shown), each of the differential voltages is passed, in a first stage, to a respective differential amplifier that compares the differential voltage with a reference voltage level; and the outputs of the differential amplifiers are passed, in a second stage, to a subtractor to find the difference between the outputs and remove common-mode noise. The illustrated implementation uses a differential difference amplifier (DDA) 1230 to effectively provide front-end subtraction of common-mode noise along with amplification of the signal in a single stage, such that the desired signal is amplified without the noise.

The DDA 1230 generates a differential output voltage (Von 235$n$ and Vop 235$p$) based on a first pair of differential inputs (1235$p$ and 1235$n$), a second pair of differential inputs (1237$p$ and 1237$n$), and a feedback network 1240. The differential pair of outputs (Von 235$n$ and Vop 235$p$) essentially correspond to an amplified version of a difference between the self-capacitive response of the ith channel and the self-capacitive response of the (i+1)th channel with the base self-capacitance of the two channels (i.e., the common-mode capacitively coupled display noise) canceled. Each differential output from the sample and hold block 930 is coupled with a respective one of the first pair of differential inputs (1235$p$ and 1235$n$). The feedback network 1240 includes two nominally identical feedback branches to effectively set the feedback gain of the DDA 1240. For example, in the illustrated implementation, the first feedback branch includes a first feedback resistor (Rfba) and a first feedback capacitor (Cfba), and the second feedback branch includes a second feedback resistor (Rfbb) and a second feedback capacitor (Cfbb). The first feedback branch is coupled between the positive differential output voltage (Vop 235$p$) and the negative second differential input (1237$n$), the second feedback branch is coupled between the negative differential output voltage (Von 235$n$) and the positive second differential input (1237$p$), and a third feedback resistor (Rfbc) is coupled between the branches. The feedback gain can be a function of the ratio between the third feedback resistor (Rfbc) and the first and second feedback resistors (Rfba, Rfbb).

The capacitively coupled display noise (i.e., the base self-capacitance) is coupled with both of the first pair of differential inputs (1235$p$ and 1235$n$) in a substantially identical manner (i.e., both because it is assumed to be common-mode noise and further because it has been mixed by the passive mixer 920). As such, this common-mode portion of the received signal is immediately rejected by the DDA 1230 when generating the differential output voltages Von 235n, Vop 235p. The fed-back signals, then, reinforce (i.e., amplify) substantially only the desired signal portion of the channel signals received at the first pair of differential inputs (1235p and 1235n). FIG. 13 shows an illustrative representation of the Vout 235 waveform output by the DDA 1230 (i.e., corresponding to differential output voltages, Von 235p and Vop 235n. The illustrated waveform is shown over at least a full period 1305, including a first readout cycle corresponding to a first passive mixer 920 configuration (e.g., pass-through) and a second readout cycle corresponding to a second passive mixer 920 configuration (e.g., swapped).

Figure 14:
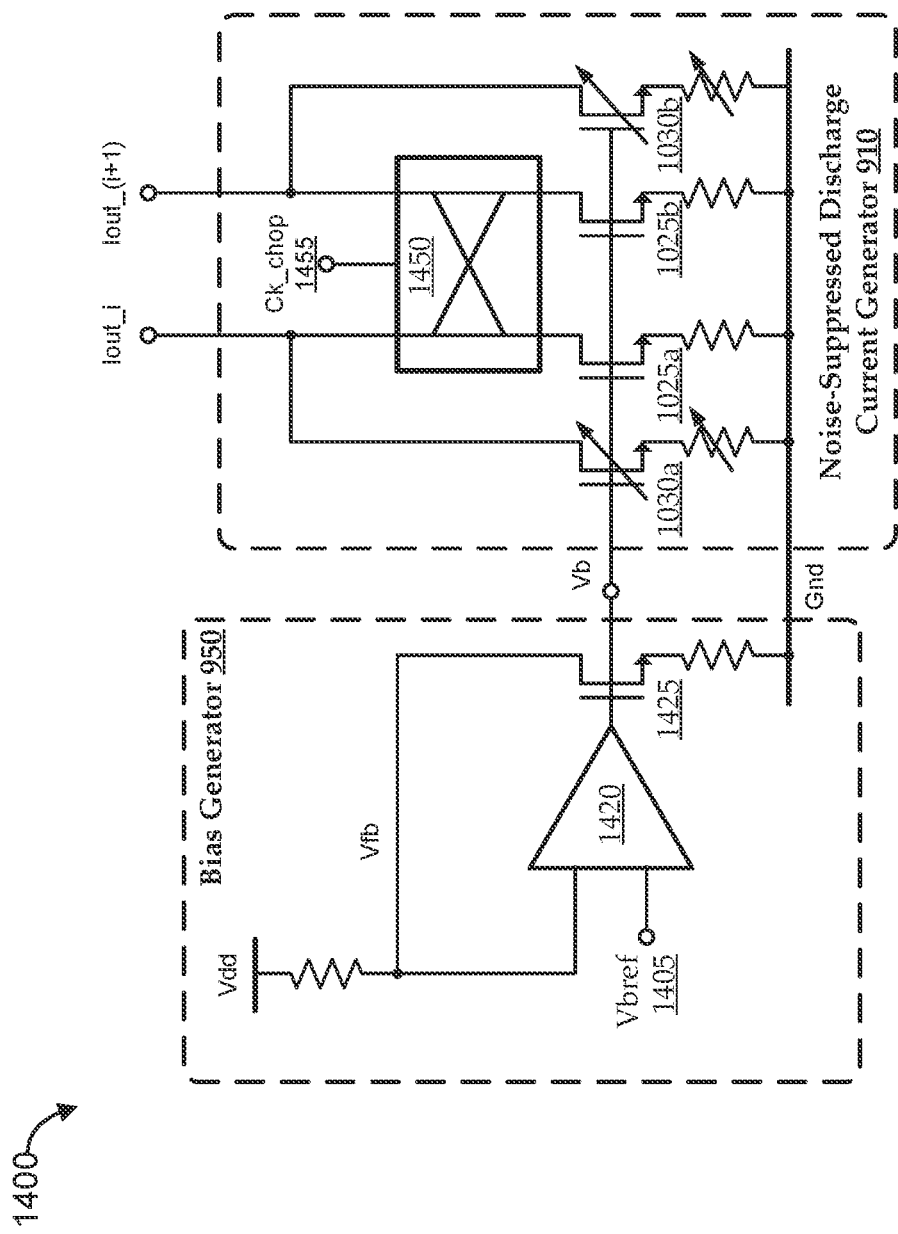
FIG. 14 shows a circuit block diagram of an illustrative implementation of a differential discharge stage including an instance of a noise-suppressed discharge current generator coupled with a bias generator, according to several embodiments described herein.

FIG. 14 shows a circuit block diagram of an illustrative implementation of a differential discharge stage 1400 including an instance of a noise-suppressed discharge current generator 910 coupled with a bias generator 950, according to several embodiments described herein. The differential discharge stage 1400 can be an implementation of the discharge stage 302 of FIG. 3 or 9. Each of FIGS. 10 and 11 show a single Iout_i node representing a single generated discharge current for an ith touch sense channel (i.e., for an ith instance of the discharge stage 302i that includes an ith instance of the noise-suppressed discharge current generator 910i). In FIG. 14, the noise-suppressed discharge current generator 910 is illustrated as concurrently generating two discharge currents for two (e.g., adjacent) touch sense channels, labeled as Iout_i and Iout (i+1). For example, discharge currents for the first two touch sense channels are Iout_1 and Iout_2, corresponding to first and second instances of discharge stage 302. Thus, the illustrated noise-suppressed discharge current generator 910 is configured for differential operation, such as for coupling with a sensing stage implemented according to FIG. 12. For example, the noise-suppressed discharge current generator 910 of FIG. 14 can be coupled with the differential sensing stage 1200 of FIG. 12 by coupling the nodes labeled Iout_i and Iout (i+1) in FIG. 14 with the nodes labeled Vin 310i and Vin 310(i+1) in FIG. 12, respectively. In some such differential implementations, for N touch sense channels, there may be fewer than N instances of the noise-suppressed discharge current generator 910 (e.g., there may be N−1 instances).

The noise-suppressed discharge current generator 910 receives a bias voltage (Vb) from the bias generator 950. In the illustrated implementation, the noise-suppressed discharge current generator 910 can operate without a local bias generator 1120, as the noise suppression does not rely on feedback from the current sources 1025 to the bias generator 950 (e.g., as there is in FIGS. 10 and 11). Embodiments of the noise-suppressed discharge current generator 910 can operate with any suitable Vb to generate corresponding discharge currents according to any suitable profile. For example, Vb can have a constant voltage profile, a ramped voltage profile, or any other suitable voltage profile. The illustrated bias generator 950 can be shared by multiple instances of the noise-suppressed discharge current generator 910.

The illustrated bias generator 950 includes a bias voltage generator 1420 and a master current source 1425. The bias voltage generator 1420 is represented as an operational amplifier. One differential input to the operational amplifier is coupled with a bias reference voltage (Vbref). Vbref can be a constant reference voltage, a ramped reference voltage, or any suitable reference voltage for generating Vb with a desired voltage profile. A second differential input to the operational amplifier (bias voltage generator 1420) is coupled in feedback with the master current source 1425. In particular, the drain of the master current source 1425 can be coupled with a feedback voltage (Vfb) node; and the Vfb node is also coupled with a local source voltage (Vdd) via a resistor and with the second differential input to the operational amplifier. The output of the operational amplifier (bias voltage generator 1420) drives the master current source 1425, so that the current through the master current source 1425 is controlled by Vbref and Vfb. The same Vb used to drive the master current source 1425 is used to drive current sources 1025 (e.g., and trim current sources 1030), so that the feedback-regulated current through the master current source 1425 is mirrored to all current sources of the noise-suppressed discharge current generator 910.

As illustrated, embodiments of the noise-suppressed discharge current generator 910 include a pair of current sources 1025 (illustrated as 1025a and 1025b) and a chopper 1450, which is controlled by a chopping clock signal (Ck_chop) 1455. Each period of Ck_chop 1455 includes two cycles. In each first cycle (e.g., a first half of each period), the chopper 1450 is in a pass-through configuration in which it couples a first current path corresponding to Iout_i with the first current source 1025a and couples a second current path corresponding to Iout (i+1) with the second current source 1025b; in each second cycle (e.g., a second half of each period), the chopper 1450 is in a swapped configuration in which it couples the first current path corresponding to Iout_i with the second current source 1025b and couples the second current path corresponding to Iout (i+1) with the first current source 1025a. Toggling between the configurations can result in the noise contribution from each current source 1025 being present in each channel for only half of the time. Further, the chopping can effectively cause any noise from the current sources 1025 to become common-mode noise on adjacent channels, and that common-mode noise can be rejected by implementing the sensing stage 303 in a similarly differential manner (e.g., such as in FIG. 9).

In some embodiments, the noise-suppressed discharge current generator 910 can further include a trim current source 1030 for each branch (i.e., a first trim current source 1030a associated with first current source 1025a and a second trim current source 1030b associated with second current source 1025b). The trim current sources 1030 can be configured to fine tune the amount of current generated by each branch. For example, when using the chopper 1450, it can be desirable to ensure that each branch of the noise-suppressed discharge current generator 910 is substantially identical, so that the generated discharge current for a channel is substantially the same over the entire period of Ck_chop 1455 (i.e., for both cycles). However, even if the branches are designed to be nominally identical (i.e., the components are intended to be identical in design), there can naturally be differences based on process variations (e.g., differences between 1025a and 1025b). Further, there may be differences in channels to which the branches are coupled. For example, the self-capacitors associated with the ith and (i+1)th channels will not be identical. The trim current sources 1030 can be adjusted to ensure that each branch generates a substantially identical amount of discharge current by compensating for any physical or other differences between the branches.

As noted above, the differential discharge stage 1400 of FIG. 14 can be coupled with a differential sense circuit, such as the differential sensing stage 1200 illustrated in FIG. 12.

Figure 15:
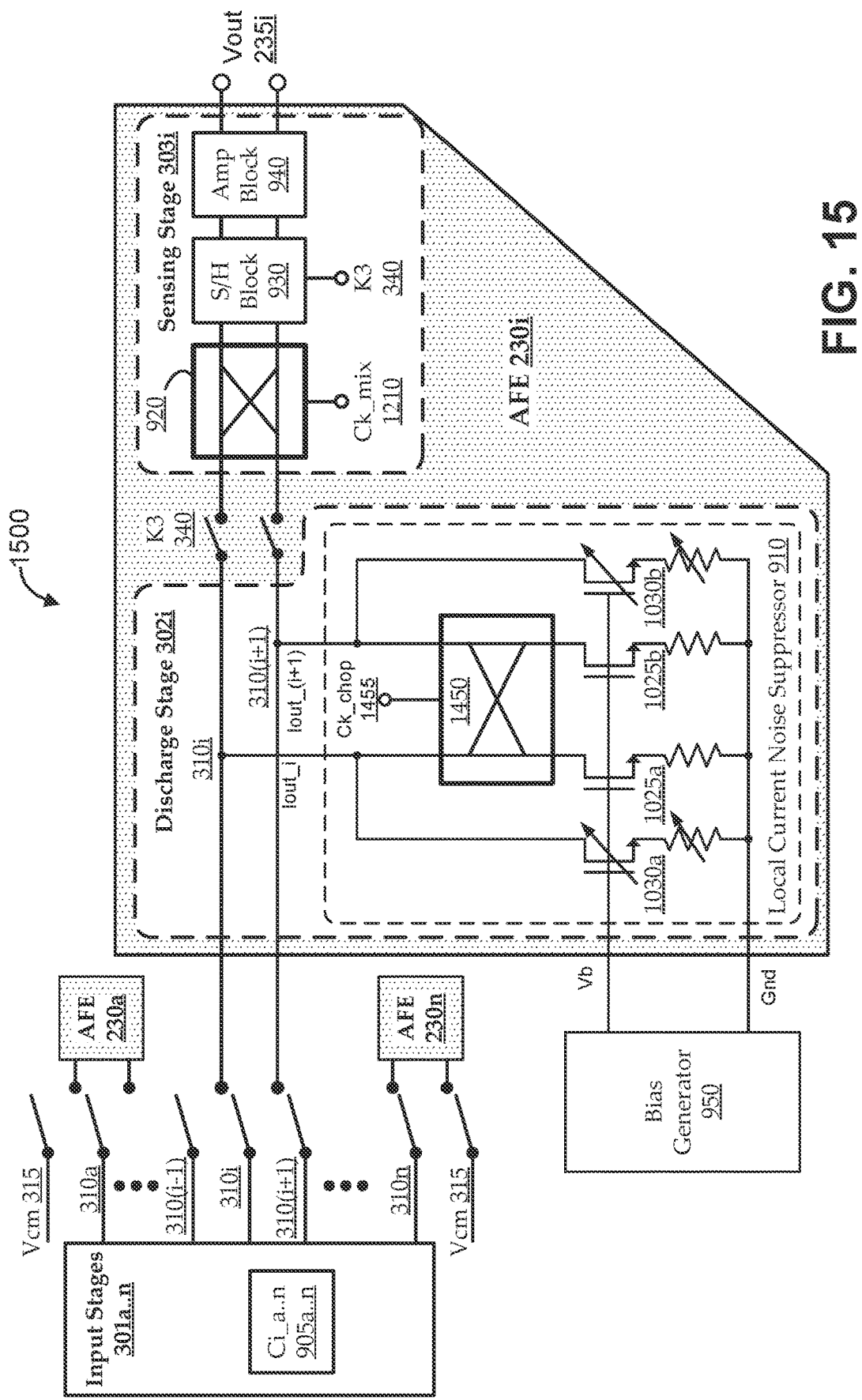
FIG. 15 shows an example configuration of a capacitive touch sensing environment in which the differential discharge stage of FIG. 14 is coupled with the differential sense circuit implementing the passive mixer as in FIG. 12.

FIG. 15 shows an example configuration of a capacitive touch sensing environment 1500 in which the differential discharge stage 1400 of FIG. 14 is coupled with the differential sense circuit implementing the passive mixer 920 as in FIG. 12. Except as otherwise described, the illustrated discharge stage 302i operates in the same manner as described with reference to FIG. 14 and the illustrated sensing stage 303i operates in the same manner as described with reference to FIGS. 12 and 13. The environment 1500 further includes N instances of input stage 301 (illustrated as input stages "301a . . . n," representing 301a-301n), each having a respective channel self-capacitance (Ci) 905 (illustrated as "Ci_a . . . n 905a . . . n," representing Ci_a 905a-Ci_n 905n). As described herein, the output of each ith input stage 301i can be its respective Vin 310i.

In the illustrated configuration, the respective outputs (respective Vin 310 nodes) of the N input stages 301 can be switchably coupled with respective ones of N AFEs 230 (illustrated as AFE 230a-AFE 230n). For example, at a first time, switches at the inputs of each AFE 230 are in a first state in which: the first AFE 230a is coupled with Vin 310a and Vin 310(a+1); each ith AFE 230i is coupled with Vin 310i and Vin 310(i+1); and the last AFE 230n is coupled with Vin 310n and Vcm 315. In a second time, switches at the inputs of each AFE 230 change to a second state in which: the first AFE 230a is now coupled with Vcm 315 and Vin 310a; each ith AFE 230i is now coupled with Vin 310(i−1) and Vin 310i; and the last AFE 230n is now coupled with Vin 310(n−1) and Vin 310n.

As illustrated, the pair of nodes received by any ith AFE 230i (e.g., Vin 310i and Vin 310(i+1) nodes) are coupled both with inputs to the passive mixer 920 and with inputs to the chopper 1450. The passive mixer 920 toggles between pass-through and swapped configurations at a toggling rate controlled by Ck_mix 1210, and the chopper 1450 toggles between pass-through and swapped configurations at a toggling rate controlled by Ck_chop 1455. Embodiments of such a configuration can be implemented so that the toggling rate of the passive mixer 920 is R times the toggling rate of the chopper 1450, where R is an integer greater than one. For example, the passive mixer 920 can toggle its configuration twice as often as the chopper 1450 toggles its configuration.

Figure 16:
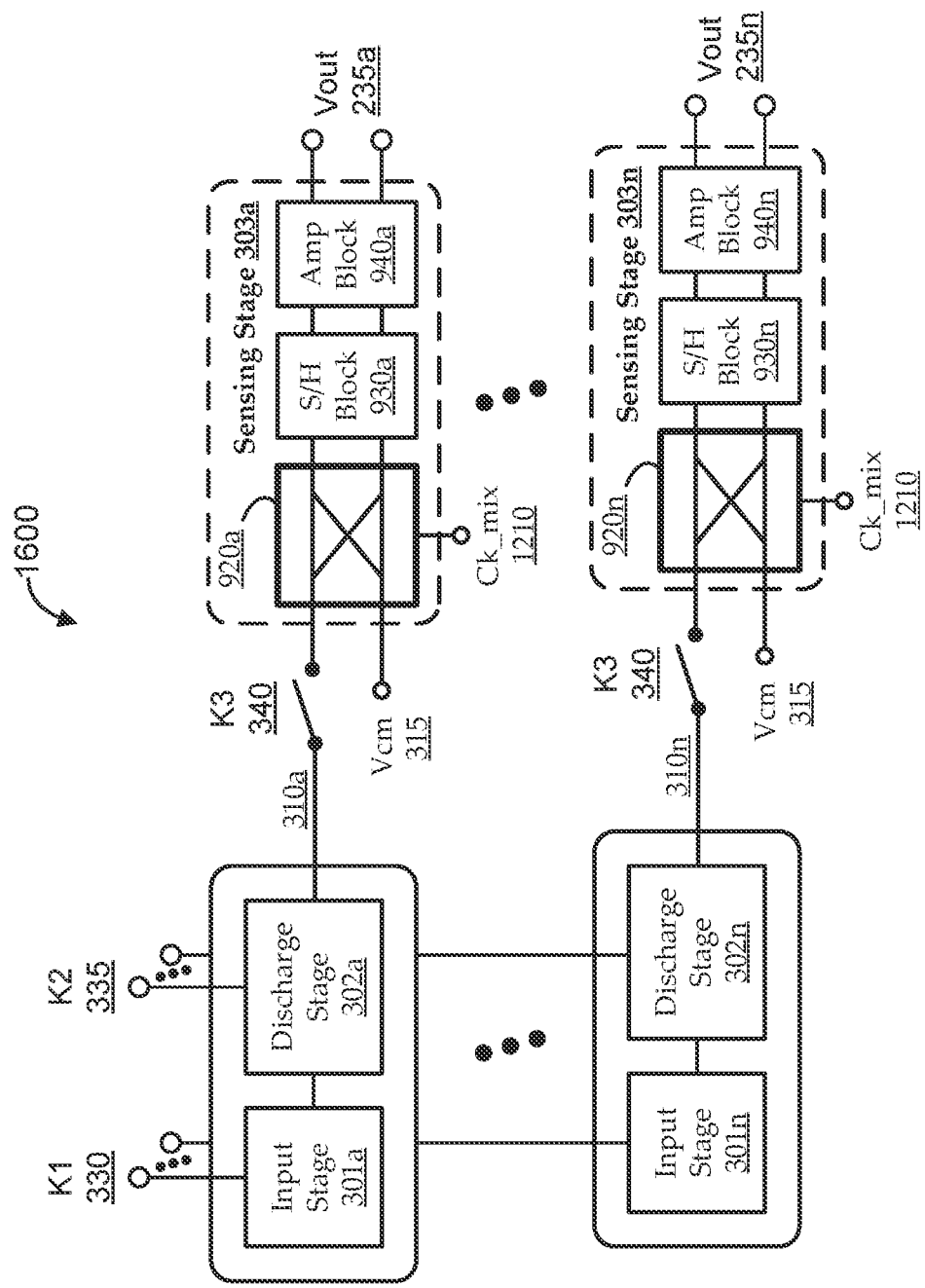
FIG. 16 shows an example configuration of a capacitive touch sensing environment in which a single-ended discharge stage is coupled with a single-ended sense stage, according to various embodiments described herein.

While the preceding embodiments show differential implementations, other embodiments can include single-ended implementations. FIG. 16 shows an example configuration of a capacitive touch sensing environment 1600 in which a single-ended discharge stage is coupled with a single-ended sense stage, according to various embodiments described herein. N instances are shown to support N touch sense channels of a touch panel array. Though not explicitly shown, each of N input stages 301 (illustrated as input stages 301a-301n) including a respective self-capacitance (Ci) that includes a base capacitance manifesting capacitively coupled display noise from an integrated display and, in the presence of a touch event, additional touch capacitance. N instances of the single-ended discharge stage 302 are illustrated as discharge stages 302a-302n. Each instance of the discharge stage 302 can include a single-ended implementation of the noise-suppressed discharge current generator 910 of FIG. or 11 (e.g., including a rotator 1020).

As described above, the output of each discharge stage 302 can be treated as a respective Vin 310 node (illustrated as nodes 310a-310n). For example, Vin corresponds to a voltage across Ci (e.g., accounting for one or more impedance sources in the input stage 301) and is charged to a charged voltage level during a first phase (e.g., phase 402a of FIG. 4, based on timing of switch K1 330) and discharged to a discharge voltage level during a second phase (e.g., phase 402b of FIG. 4, based on timing of switch K2 335). In a third phase, (e.g., phase 402c of FIG. 4), each Vin 310 can be coupled with a respective one of N instances of a sensing stage 303 (illustrated as sensing stages 303a-303n) via a switch K3 340. As described previously (e.g., with reference to FIG. 9), each instance of the sensing stage 303 can include a passive mixer 920, a sample and hold block 930, and an amplifier block 940 (illustrated as passive mixers 920a-920n, sample and hold blocks 930a-930n, and amplifier blocks 940a-940n).

As described above, each passive mixer 920 includes two inputs. In the illustrated single-ended configuration, a first input of each passive mixer 920 is coupled (via switch K3 340) with an associated Vin 310 (e.g., the first input of passive mixer 920a is coupled with Vin 310a). A second input of each passive mixer 920 is coupled with a common-mode reference voltage level, Vcm 315. In some embodiments, all instances of the passive mixer 920 receive the same Vcm 315. In other embodiments, different instances of the passive mixer 920 can receive different reference levels, corresponding to different values for Vcm 315. In some such embodiments, each of multiple regions of a display panel may tend to capacitively couple a respective regional level of display noise onto channels of the touch panel array that are physically located adjacent to those regions; and the value of Vcm 315 for sensing stages 303 associated with channels physically located adjacent to a particular region can reflect the corresponding regional level of display noise.

As described above, each passive mixer 920 can toggle between a pass-through configuration and a swapped configuration in response to a Ck_mix 1210 signal (e.g., which can be the same for all passive mixers 920, or different for different passive mixers 920). Thus, the output of each ith passive mixer 920 toggles between a differential pair of outputs at Vin 310i and Vcm 315, respectively, and a differential pair of outputs at Vcm 315 and Vin 310i, respectively. Correspondingly, the sampled voltage at each ith sample and hold block 930i is toggled between a differential voltage representing Vin 310i-Vcm 315 and a voltage representing Vcm 315-Vin 310i. This differentially sampled and held voltage can be used by each ith instance of the amplifier block 940 in the same manner as described above with reference to differential embodiments (e.g., in FIG. 12 or 15).

Figure 17:
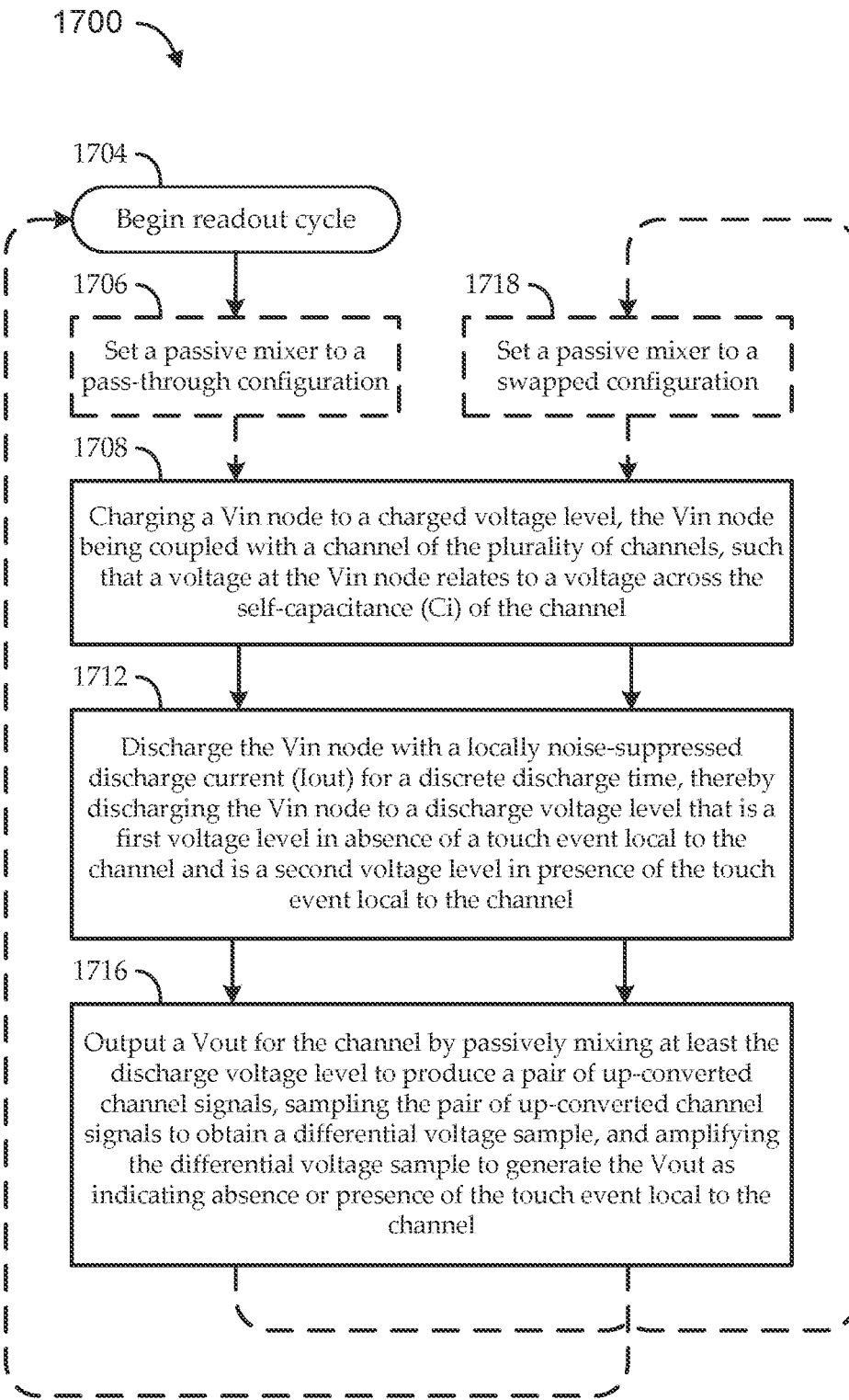
FIG. 17 shows a flow diagram of an illustrative method 1700 for self-capacitor sensing in a touch panel array, according to embodiments described herein.

FIG. 17 shows a flow diagram of an illustrative method 1700 for self-capacitor sensing in a touch panel array, according to embodiments described herein. As described herein, embodiments operate in context of a touch panel array integrated with a display panel, the touch panel array having multiple channels (e.g., touch sense channels, such as row lines and/or column lines). Each channel has a respective channel self-capacitance that includes a respective base self-capacitance corresponding to display noise capacitively coupled onto the channel from the display panel and a respective touch capacitance that changes responsive to presence of a touch event local to the channel. The method 1700 can represent a readout cycle for the channel. For example, the method 1700 is shown as beginning at stage 1704, labeled "begin readout cycle." Stages 1708, 1712, and 1716 can represent first, second, and third phases of the readout cycle.

At stage 1708 (e.g., at a first phase of the readout cycle), embodiments of the method 1700 can charge a voltage input (Vin) node to a charged voltage level. The Vin node is coupled with a channel of the plurality of channels, such that a voltage at the Vin node relates to a voltage across the respective self-capacitance (Ci) of the channel coupled thereto. Once charged, the charged voltage level of the Vin node can be a source voltage (e.g., Vcc), some fraction of a source voltage based on one or more impedances associated with the channel, etc.

At stage 1712 (e.g., at a second phase of the readout cycle following the first phase), embodiments of the method 1700 can discharge the Vin node with a locally noise-suppressed discharge current (Iout) for a discrete discharge time. The Iout and the discrete charging time can be configured so that the Vin node is discharged to a discharge voltage level that is a first voltage level in absence of a touch event local to the channel and is a second voltage level in presence of the touch event local to the channel. For example, after the discrete discharge time has elapsed, the remaining charge on Ci (and the corresponding level of Vin 310) is detectably different between touch event and non-touch event conditions.

As described herein, the locally noise-suppressed discharge current (Iout) can be provided by embodiments of the discharge stage 302 described herein, which include a noise-suppressed discharge current generator. Embodiments of the noise-suppressed discharge current generator include a rotating current source. In some embodiments, the rotating current source is implemented by iterating sequentially through M configurations of a rotator (M being an integer greater than 1), such as in FIG. 10 or 11. For example, the rotator has M source ports, each coupled with a respective one of M current sources, each of the M current sources being biased by a bias voltage (e.g., a constant bias voltage, a ramp-down bias voltage, etc.) generated by a bias generator based at least on bias feedback. The rotator also includes a feedback port coupled in feedback with the bias generator, and a drain port coupled with the Vin node via a discharge current path. In each mth condition of the M conditions (i.e., m is a counter from 1 to M), the iterating comprises: generating the bias feedback at the feedback port based on an mth current source of the M current sources; and generating the Iout based at least on a sum of currents through the M−1 current sources other than the mth current source. In other embodiments, the rotating current source is implemented by swapping configurations of a chopper, such as in FIG. 14 or 15.

At stage 1716 (in a third phase of the readout cycle following the second phase), embodiments of the method 1700 can output a voltage output (Vout) for the channel. The outputting can be implemented by embodiments of the sensing stage 303 described herein. The outputting can include passively mixing at least the discharge voltage level to produce a pair of up-converted channel signals, sampling the pair of up-converted channel signals to obtain a differential voltage sample, and amplifying the differential voltage sample to generate the Vout as indicating absence or presence of the touch event local to the channel.

In some embodiments, each readout cycle is performed as two half-cycles, each with a passive mixer toggled into a different configuration. As described herein, toggling the passive mixer in this way can produce the effect of frequency-domain up-conversion without having to double circuitry for charging, discharging, sensing, etc. For example, as illustrated in FIG. 17, a first half cycle of each readout cycle can be implemented by setting the passive mixer to a pass-through configuration at stage 1706, and performing stages 1708, 1712, and 1716 with the passive mixer in the pass-through configuration. A second half cycle of each readout cycle can be implemented by setting the passive mixer to a swapped configuration at stage 1718, and performing stages 1708, 1712, and 1716 with the passive mixer in the swapped configuration. As described herein, the passive mixer receives the discharge voltage level of the Vin node at a first input. At a second input, the passive mixer receives either another discharge voltage level associated with an adjacent channel (e.g., the inputs receive Vin_i and Vin_(i+1), respectively), or the passive mixer receives a common-mode reference voltage level (e.g., Vcm). The passive mixer can implement the passively mixing in stage 1716 to produce the pair of up-converted channel signals at first and second outputs by: in each first half-cycle, with the passive mixer in the pass-through configuration, coupling the first input with the first output and the second input with the second output; and in each second half-cycle, with the passive mixer in the swapped configuration, coupling the first input with the second output and the second input with the first output.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second." "third," etc, may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A system for self-capacitor sensing in a touch panel array integrated with a display panel, the touch panel array having a plurality of channels, each having a respective channel self-capacitance that includes a respective base self-capacitance corresponding to display noise capacitively coupled onto the channel from the display panel and a respective touch capacitance that changes responsive to presence of a touch event local to the channel, the system comprising:
a voltage input (Vin) node coupled with a channel of the plurality of channels, such that Vin represents a voltage across the respective self-capacitance (Ci) of the channel;
a discharge stage configured to couple the Vin node with a locally noise-suppressed discharge current (Iout) for a discrete discharge time during a discharge phase to discharge the Vin node to a discharge voltage level, such that the discharge voltage level is a first voltage level in absence of a touch event local to the channel and is a second voltage level in presence of the touch event local to the channel,
wherein the Iout is generated by iterating sequentially through M configurations of M current sources, M being an integer greater than 1, and in each mth configuration of the M configurations, generating the Iout based on a sum of currents through M−1 of the M current sources other than an mth of the M current sources; and
a sensing stage coupled with the discharge stage to output a voltage output (Vout) for the channel by passively mixing at least the discharge voltage level to produce a pair of up-converted channel signals, sampling the pair of up-converted channel signals to obtain a differential voltage sample, and amplifying the differential voltage sample to generate the Vout as indicating absence or presence of the touch event local to the channel.

2. The system of claim 1, further comprising:
a phased switch controller configured to control readout of the channel over a readout period, such that:
in a first phase, the phased switch controller directs charging of the Vin node to a charged voltage level;
in the discharge phase, subsequent to the first phase, the phased switch controller directs discharging of the Vin node by the discharge stage to the discharge voltage level; and
in a third phase, the phased switch controller directs outputting of the Vout for the channel by the sensing stage.

3. The system of claim 1, wherein the discharge stage comprises:
a bias generator to generate a bias voltage based at least on bias feedback; and
a rotator having: M source ports, each coupled with a respective one of the M current sources; a feedback port coupled in feedback with the bias generator; and a drain port coupled with the Vin node via a discharge current path,
wherein the rotator is configured to iterate sequentially through the M configurations, generating, for each mth condition of the M conditions: the bias feedback at the feedback port based on an mth current source of the M current sources; and the Iout based on the sum of currents through the M−1 current sources other than the mth current source.

4. The system of claim 3, wherein the discharge stage further comprises:
a trim current source biased by the bias voltage,
wherein in each mth condition, each of the M−1 current sources other than the mth current source produces a unit current (Iunit) that is 1/(M−1) of the Iout,
the trim current source produces a trim current that is an adjustable fraction (α) of the unit current, and
the trim current source is coupled with the Vin node in parallel with the rotator, such that the Iout=(M−1+α)*Iunit.

5. The system of claim 3, wherein the bias generator comprises:
a shared bias generator to generate a bias reference voltage; and
a local bias generator to generate the bias voltage based on the bias reference voltage and the bias feedback.

6. The system of claim 5, wherein the shared bias generator generates a constant bias reference voltage.

7. The system of claim 5, wherein the shared bias generator comprises a shared ramp generator that generates the bias reference voltage to have a ramp-down voltage profile.

8. The system of claim 5, wherein the local bias generator comprises an operational amplifier configured to receive the bias reference voltage at a first differential input, to receive the bias feedback at a second differential input, and to generate the bias voltage at an output based at least on toggled swapping of the first and second differential inputs.

9. The system of claim 1, wherein the sensing stage comprises:
a passive mixer having:
a first input coupled with the Vin node to receive the discharge voltage level; and
a second input to receive a common-mode reference voltage level (Vcm),
the passive mixer to passively mix the discharge voltage level with the Vcm to produce the pair of up-converted channel signals by iteratively toggling between a pass-through configuration and a swapped configuration of the first and second inputs at a toggling rate controlled by a mixer clock.

10. The system of claim 9, wherein the sensing stage further comprises:
an amplifier block having at least a first pair of differential inputs; and
a sample and hold block coupled with the passive mixer and configured to sample the pair of up-converted channel signals to obtain the differential voltage sample, and to hold the differential voltage sample on a charge storage device coupled across the first pair of differential inputs.

11. The system of claim 10, wherein the amplifier block further comprises:
a feedback network; and
a differential difference amplifier (DDA) having a pair of differential outputs, the first pair of differential inputs, and a second pair of differential inputs coupled in negative feedback with the pair of differential outputs via the feedback network.

12. The system of claim 1, further comprising:
a plurality of instances of the Vin node, each to couple with a respective channel of the plurality of channels, such that each ith instance of the Vin node (Vin_i) represents a voltage across the ith respective Ci (Ci_i) of the ith respective channel coupled thereto;
a plurality of instances of the discharge stage, wherein each ith instance of the discharge stage is configured to couple the Vin_i with an ith locally noise-suppressed discharge current (Iout_i) during a discharge phase to discharge the Vin_i to an ith respective discharge voltage level, each ith respective discharge voltage level being the first voltage level in absence of a touch event local to the ith respective channel and being the second voltage level in presence of the touch event local to the ith respective channel; and
a plurality of instances of the sensing stage coupled with the plurality of instances of the discharge stage, wherein each ith instance of the sensing stage is configured to output an ith respective voltage output (Vout_i) for the ith respective channel by passively mixing at least the ith discharge voltage level to produce an ith pair of up-converted channel signals, sampling the ith pair of up-converted channel signals to obtain an ith differential voltage sample, and amplifying the ith differential voltage sample to generate an ith voltage output instance indicating absence or presence of the touch event local to the ith respective channel.

13. The system of claim 12, further comprising:
a bias generator configured to generate a bias voltage,
wherein multiple of the plurality of instances of the discharge stage are configured to generate the locally noise-suppressed discharge current based on the bias voltage.

14. The system of claim 12, wherein each ith instance of the discharge stage comprises:
a first current source and a second current source, each biased by a bias voltage; and
a chopper having a first input coupled with Vin_i via a first discharge current path, a second input coupled with an (i+1)th instance of the Vin node via a second discharge current path, a first output coupled with the first current source, and a second output coupled with the second current source,
wherein the chopper is configured to toggle between a pass-through configuration and a swapped configuration at a rate controlled by a chopping clock, the pass-through configuration coupling the first input with the first output and the second input with the second output, the swapping configuration coupling the first input with the second output and the second input with the first output.

15. The system of claim 14, wherein each ith instance of the discharge stage further comprises:
a first trim current source biased by the bias voltage and coupled in parallel with the first discharge current path; and
a second trim current source biased by the bias voltage and coupled in parallel with the second discharge current path,
wherein the ith instance of the discharge stage produces Iout_i on the first discharge current path based on current through both the first trim current source and one of the first current source or the second current source, and
the ith instance of the discharge stage produces an (i+1)th locally noise-suppressed discharge current on the second discharge current path based on current through both the second trim current source and the other of the first current source or the second current source.

16. The system of claim 14, wherein the bias voltage is a ramp-down bias voltage.

17. A display system comprising:
the display panel;
the touch panel array integrated with the display panel and having a plurality of channels, each having a respective channel self-capacitance that includes a respective base self-capacitance corresponding to display noise capacitively coupled onto the channel from the display panel and a respective touch capacitance that changes responsive to presence of a touch event local to the channel; and
a plurality of instances of the system of claim 1, each instance of the Vin node coupled with a respective one of the plurality of channels.

18. A method for self-capacitor sensing in a touch panel array integrated with a display panel, the touch panel array having a plurality of channels, each having a respective channel self-capacitance that includes a respective base self-capacitance corresponding to display noise capacitively coupled onto the channel from the display panel and a respective touch capacitance that changes responsive to presence of a touch event local to the channel, the method comprising:
charging, in a first phase of a readout cycle, a voltage input (Vin) node to a charged voltage level, the Vin node being coupled with a channel of the plurality of channels, such that a voltage at the Vin node relates to a voltage across the respective self-capacitance (Ci) of the channel coupled thereto;
generating a locally noise-suppressed discharge current (Iout) by iterating sequentially through M configurations of M current sources, M being an integer greater than 1, and in each mth configuration of the M configurations, generating the Iout based on a sum of currents through M−1 of the M current sources other than an mth of the M current sources;
discharging, in a second phase of the readout cycle following the first phase, the Vin node with the Iout for a discrete discharge time, thereby discharging the Vin node to a discharge voltage level that is a first voltage level in absence of a touch event local to the channel and is a second voltage level in presence of the touch event local to the channel; and
outputting, in a third phase of the readout cycle following the second phase, a voltage output (Vout) for the channel by passively mixing at least the discharge voltage level to produce a pair of up-converted channel signals, sampling the pair of up-converted channel signals to obtain a differential voltage sample, and amplifying the differential voltage sample to generate the Vout as indicating absence or presence of the touch event local to the channel.

19. The method of claim 18, wherein:
the iterating is sequentially through the M configurations of a rotator comprising:
M source ports, each coupled with a respective one of the M current sources, each of the M current sources being biased by a bias voltage generated by a bias generator based at least on bias feedback;
a feedback port coupled in feedback with the bias generator; and
a drain port coupled with the Vin node via a discharge current path; and in each mth condition of the M conditions, the generating further comprises generating the bias feedback at the feedback port based on the mth current source of the M current sources.

20. The method of claim 18, further comprising:

in a first half-cycle of the readout cycle:
- setting a passive mixer to a pass-through configuration; and
- performing the charging, the discharging, and the outputting with the passive mixer in the pass-through configuration; and in a second half-cycle of the readout cycle:
- setting the passive mixer to a swapped configuration; and
- performing the charging, the discharging, and the outputting with the passive mixer in the swapped configuration, wherein the passive mixer receives the discharge voltage level of the Vin node at a first input, receives either another discharge voltage level associated with an adjacent channel or receives a common-mode reference voltage level at a second input, and produces the pair of up-converted channel signals at first and second outputs by:

in the pass-through configuration, coupling the first input with the first output and the second input with the second output; and in the swapped configuration, coupling the first input with the second output and the second input with the first output.

* * * * *